United States Patent
Morgan et al.

(10) Patent No.: US 11,588,759 B2
(45) Date of Patent: Feb. 21, 2023

(54) AUTOMATED COMMUNICATIONS OVER MULTIPLE CHANNELS

(71) Applicant: ASAPP, INC., New York, NY (US)

(72) Inventors: Mitchell Steven Morgan, Jersey City, NJ (US); Frederick William Poe Heckel, New York, NY (US); Priya Sawant, Brooklyn, NY (US); Adrien Brochard, New York, NY (US); Christopher David Fox, New York, NY (US); Tao Lei, Jersey City, NJ (US); Joseph Ellsworth Hackman, New York, NY (US)

(73) Assignee: ASAPP, INC., New York, NY (US)

( * ) Notice: Subject to any disclaimer, the term of this patent is extended or adjusted under 35 U.S.C. 154(b) by 123 days.

(21) Appl. No.: 16/503,529

(22) Filed: Jul. 4, 2019

(65) Prior Publication Data

US 2020/0329144 A1 Oct. 15, 2020

Related U.S. Application Data

(60) Provisional application No. 62/833,262, filed on Apr. 12, 2019.

(51) Int. Cl.
*H04M 3/00* (2006.01)
*H04L 51/02* (2022.01)
(Continued)

(52) U.S. Cl.
CPC .......... *H04L 51/02* (2013.01); *G06F 16/9024* (2019.01); *G06F 40/30* (2020.01);
(Continued)

(58) Field of Classification Search
CPC .......................... H04M 3/5191; H04M 3/5141
(Continued)

(56) References Cited

U.S. PATENT DOCUMENTS 9,715,496 B1 * 7/2017 Sapoznik ............ G06F 16/2237
9,892,414 B1 2/2018 Henry
(Continued)

FOREIGN PATENT DOCUMENTS

EP 3122001 A1 * 1/2017 ......... G06F 16/3329
WO 2011088053 A2 7/2011
(Continued)

OTHER PUBLICATIONS

"SnatchBot Omni-Channel Platform", SnatchBot Chatbot Channels, https://snatchbot.me/channels (accessed May 31, 2019), 2019, 8 pages.
(Continued)

*Primary Examiner* — William J Deane, Jr.
(74) *Attorney, Agent, or Firm* — GTC Law Group PC & Affiliates

(57) ABSTRACT

A company may implement automated workflows for convenience of users or to reduce support costs. For example, allowing a user to change an address using an automated workflow may be faster or less expensive than with a human agent. Companies may provide support over different types of communications channels with different capabilities, such as voice channels and text channels. Instead of implementing different workflows for different channels, a company may separate aspects of the workflow that are common to different channels from aspects of the workflow that are different for different channels. For example, a workflow may be implemented to determine an action in response to a received communication where the action may be used with multiple channels. The action may then be used to select an action implementation that is specific to a channel.

20 Claims, 15 Drawing Sheets

(51) Int. Cl.
*G06F 16/901* (2019.01)
*G06N 20/00* (2019.01)
*G06F 40/30* (2020.01)
*G10L 15/26* (2006.01)
*H04M 3/51* (2006.01)
*G06F 40/295* (2020.01)
*G10L 15/16* (2006.01)
*G10L 15/18* (2013.01)

(52) U.S. Cl.
CPC .............. *G06N 20/00* (2019.01); *G10L 15/26* (2013.01); *H04M 3/5141* (2013.01); *H04M 3/5191* (2013.01); *G06F 40/295* (2020.01); *G10L 15/16* (2013.01); *G10L 15/18* (2013.01)

(58) Field of Classification Search
USPC ....... 379/265.01–265.14, 266.01–266.1, 309
See application file for complete search history.

(56) References Cited

U.S. PATENT DOCUMENTS

| | | | |
|---|---|---|---|
| 10,044,647 B1* | 8/2018 | Karp | H04L 51/02 |
| 10,083,451 B2 | 9/2018 | Sehrawat et al. | |
| 10,088,972 B2 | 10/2018 | Brown et al. | |
| 10,097,690 B1 | 10/2018 | Henry | |
| 10,109,275 B2 | 10/2018 | Henry | |
| 10,169,315 B1 | 1/2019 | Heckel et al. | |
| 10,210,244 B1 | 2/2019 | Branavan et al. | |
| 10,332,505 B2 | 6/2019 | Zoller et al. | |
| 10,395,648 B1 | 8/2019 | Benkreira et al. | |
| 10,489,792 B2 | 11/2019 | Hackman et al. | |
| 10,523,978 B1* | 12/2019 | Nielsen | H04N 21/2187 |
| 10,554,817 B1 | 2/2020 | Sullivan et al. | |
| 10,630,840 B1* | 4/2020 | Karp | H04L 51/046 |
| 10,708,424 B1 | 7/2020 | Maestas | |
| 10,726,843 B2* | 7/2020 | Liu | G06F 40/56 |
| 10,750,019 B1* | 8/2020 | Petrovykh | G10L 15/1815 |
| 11,373,044 B2 | 6/2022 | Fox et al. | |
| 2005/0105712 A1 | 5/2005 | Williams et al. | |
| 2010/0278318 A1* | 11/2010 | Flockhart | H04M 3/51 379/88.04 |
| 2012/0190333 A1* | 7/2012 | Portman | H04L 67/141 455/411 |
| 2015/0186156 A1 | 7/2015 | Brown et al. | |
| 2018/0054523 A1* | 2/2018 | Zhang | G06N 5/04 |
| 2018/0115643 A1* | 4/2018 | Skiba | H04M 3/5141 |
| 2018/0189795 A1* | 7/2018 | Frenkel | H04L 69/14 |
| 2018/0374029 A1 | 12/2018 | Henry | |
| 2019/0019197 A1 | 1/2019 | Roberts et al. | |
| 2019/0180175 A1 | 6/2019 | Meteer et al. | |
| 2019/0182383 A1* | 6/2019 | Shaev | H04M 3/527 |
| 2019/0287512 A1 | 9/2019 | Zoller et al. | |
| 2020/0019609 A1 | 1/2020 | Yu et al. | |
| 2020/0042613 A1 | 2/2020 | Jiang et al. | |
| 2020/0043015 A1* | 2/2020 | Shaev | G06F 40/284 |
| 2020/0045175 A1* | 2/2020 | Deole | H04M 3/5232 |
| 2020/0120185 A1 | 4/2020 | Salter et al. | |
| 2020/0151253 A1 | 5/2020 | Wohlwend et al. | |
| 2020/0184019 A1 | 6/2020 | Yu et al. | |
| 2020/0234694 A1 | 7/2020 | Griffiths et al. | |
| 2020/0250265 A1 | 8/2020 | Yang et al. | |
| 2020/0267260 A1* | 8/2020 | McGann | H04M 3/4936 |
| 2020/0327192 A1* | 10/2020 | Hackman | G06N 20/10 |
| 2020/0327892 A1 | 10/2020 | Fox et al. | |

FOREIGN PATENT DOCUMENTS

| | | |
|---|---|---|
| WO | 2018033897 A2 | 2/2018 |
| WO | 2020210580 A1 | 10/2020 |
| WO | 2020210580 A8 | 11/2020 |

OTHER PUBLICATIONS

PCT/US2020/027600, "International Application Serial No. PCT/US2020/027600, International Search Report and Written Opinion dated Aug. 24, 2020", ASAPP, Inc., 18 pages.

PCT/US2020/027600, "International Application Serial No. PCT/US2020/027600, Invitation to Pay Additional Fees and, Where Applicable, Protest Fee dated Jul. 2, 2020", ASAPP, Inc., 13 pages.

PCT/US2020/027600 , "International Application Serial No. PCT/US2020/027600, International Preliminary Report on Patentability dated Oct. 21, 2021", ASAPP, Inc., 12 pages.

* cited by examiner

| Workflow ID: | Intent | Information: |
|---|---|---|
| 1001 | CC_UPDATE | CC_NUMBER<br>CC_EXP<br>CC_CVC<br>CONFIRM |
| 1002 | ADDRESS_UPDATE | STREET<br>CITY<br>STATE<br>ZIP<br>CONFIRM |
| 1003 | PAY_BILL | PAYMENT_METHOD<br>AMOUNT<br>CONFIRM |
| ... | | |

Don Miller  05:03
GENERAL BILLING ISSUE
Waiting for reply...

Ray Jackson  00:07
PAYMENT
The strange charge on my account is still there. I tried to fix it myself...

Cathy Washington  01:25
GENERAL BILLING ISSUE
I need to pay the bill to my account and...

Julie Cooper  00:13
INVALID PURCHASE
Waiting for reply...

John Allen  00:13
GENERAL BILLING ISSUE
GREAT! Thanks so much for helping me.

EMPTY SLOT

EMPTY SLOT

820

TIME OUT | TRANSFER | END

How can we help you?

I need to pay the bill to my account and cancel the movie that was billed to me.

I can help you with that. To start off, please provide your credit card number.

My CC number is 1234 1234 1234 1234.

type here

830

Pay Bill Workflow (score 97)
Amount: _____
CC Number: 1234 1234 1234 1234
[Transfer Customer] [Complete Workflow]

Cancel Movie Workflow (score 93)
Movie: _____
[Transfer Customer] [Complete Workflow]

Update Credit Card Workflow (score 31)
CC Number: 1234 1234 1234 1234
Exp. Date: _____
CVC: _____
[Transfer Customer] [Complete Workflow]

Knowledge Base | Customer History | ● Customer Profile

Fig. 8B

AUTOMATED COMMUNICATIONS OVER MULTIPLE CHANNELS

CLAIM OF PRIORITY

This patent application claims the benefit of U.S. patent application Ser. No. 62/833,262, filed Apr. 12, 2019, and entitled "MAINTAINING MACHINE LANGUAGE MODEL STATE ACROSS COMMUNICATIONS CHANNELS" (ASAP-0021-P01).

The content of the foregoing application is hereby incorporated by reference in its entirety for all purposes.

BACKGROUND

Conversations between entities (e.g., people, automated response systems, and/or combinations of these) may occur in a variety of circumstances, such as customer support sessions between a customer of a company and a customer service representative who is assisting the customer. Conversations may occur over different types of channels. For example, some conversations may occur over a text channel where the participants in the conversation exchange messages in the form of text, and some conversations may occur over a voice channel where the participants in the conversation speak to each by transmitting audio signals.

In some instances, it may be desired to switch between a type of channel (e.g., from a voice channel to a text channel) or between various conversing entities (e.g., a person and/or an automated conversation entity). Presently known systems suffer from a number of drawbacks when switching between conversation channels and/or participants. For example, delays and/or interruptions may occur during transitions, such as: where the conversing entity determines that a channel or entity switch has occurred and spends time determining the new correct channel or entity; where a conversing entity utilizes an incorrect channel (e.g., missing the switch, and/or switching to the wrong channel); and/or where a conversing entity misses a message that must be repeated and/or leads to a miscommunication (e.g., where the channel has switched but the conversing entity is not aware of the switch). Additionally or alternatively, changes in the channel and/or participants may lead to more difficult or erroneous communications—for example where previous communications are not readily accessible in the new channel format; where some history of the communications is lost, forgotten, or omitted; and/or where changes in the new channel (e.g., communication conventions, addresses, etc.) lead to a delay in providing a new message, understanding a previous message, and/or providing a sub-optimal message for the new channel.

BRIEF DESCRIPTION OF THE FIGURES

The invention and the following detailed description of certain embodiments thereof may be understood by reference to the following figures:

FIG. 7 is an example list of workflows that may be handled by an automated agent.

FIGS. 8A and 8B are example user interfaces that may be used by a human agent in assisting customer.

DETAILED DESCRIPTION

Figure 1:
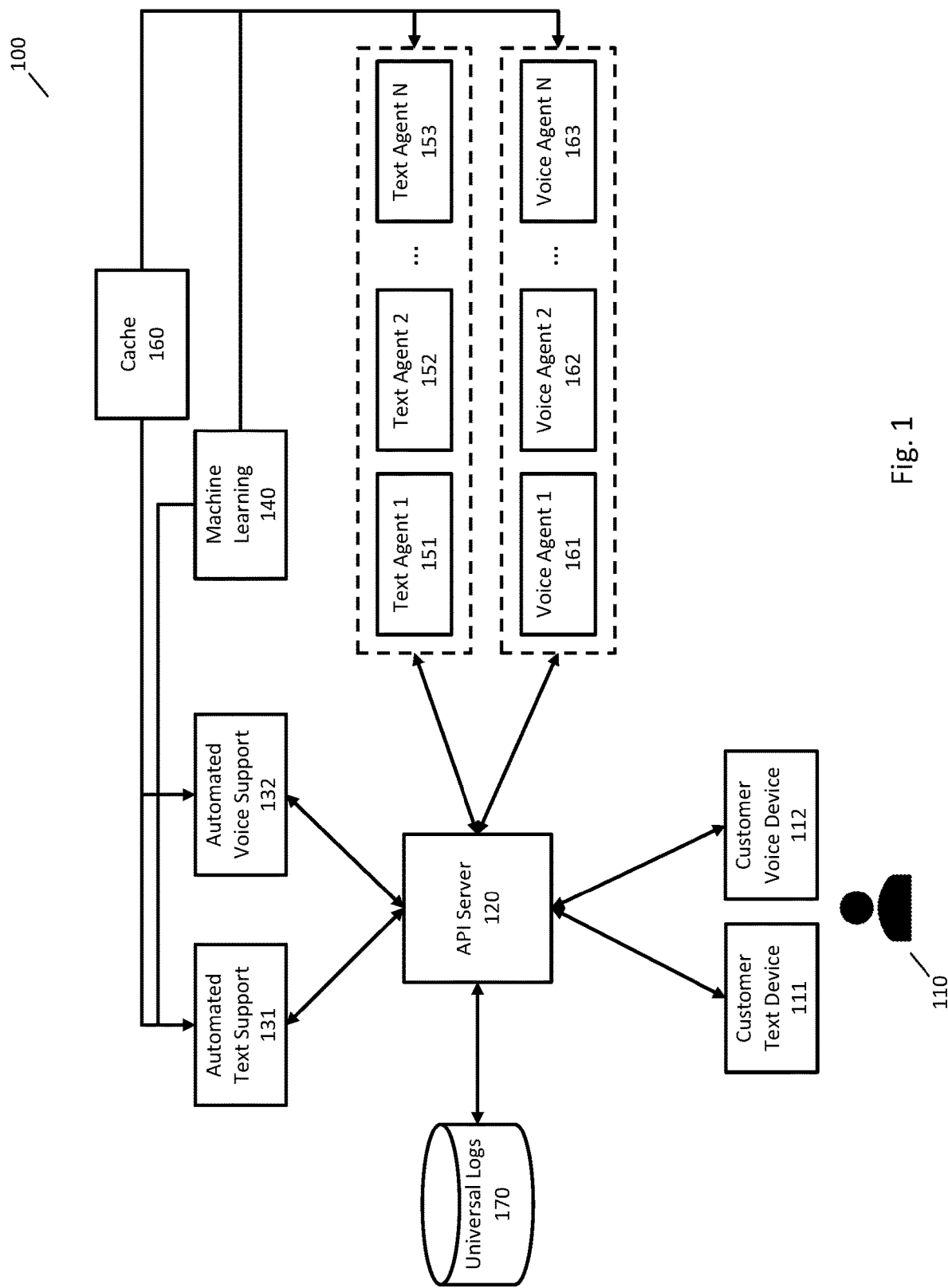
FIG. 1 is an example system for transitioning a customer support session between channels and/or between a human agent and an automated agent.

Conversations between people occur in a variety of circumstances and using a variety of types of communication channels. Conversations may occur, for example, over the phone, in a video conference, or as an exchange of text messages. In some situations, a person may have a conversation where the other end of the conversation is generated using artificial intelligence techniques and machine learning models. The techniques described herein may be used with any type of conversation but for clarity of presentation an example of a customer support session between a customer and a human customer service agent or between a customer and automated customer support will be used as an example conversation.

Companies need to efficiently interact with customers to provide services to their customers. For example, customers may need to obtain information about services of the company, may have a question about billing, or may need technical support from the company. Companies interact with customers in a variety of different ways. Companies may have a website and the customer may navigate the website to perform various actions. Companies may have an application ("app") that runs on a user device, such as a smart phone or a tablet, that provides similar services as a website. Companies may have a phone number that customers can call to obtain information via interactive voice response or to speak with a customer service representative. Companies may also respond to customers using various social media services, such as Facebook or Twitter. Companies may also interact with customers using a variety of forms of text messages. As used herein, a text message includes any message sent as text including but not limited to a message sent using email, SMS (short message service) or a special-purpose application (e.g., Facebook messenger, Apple iMessage, Google Hangouts, or WhatsApp).

In some instances, companies may provide automated support to customers. In these instances, the customer is part of a conversation where the messages received from the company are generated by a "bot" and are generated by mathematical models or processes. Accordingly, a conversation may include messages exchanged between people and computers or even between different computers (e.g., between two bots exchanging messages).

A customer may seek support from a company using a variety of communication techniques, and the techniques described herein are not limited to any particular communication techniques. For example, a customer may communicate by entering text messages or speaking, and the customer may send a message using any appropriate device, such as a computer, smart phone, tablet, wearable device, or Internet of things device. The customer may transmit the message using any appropriate techniques, such as using an app running on customer device (e.g., an app of the company or a third-party app created for processing customer requests), a web page, a text messaging client, or sending an email.

As used herein, a channel comprises any manner of transmitting communications between a company and a customer. The techniques described herein are not limited to any particular channels and the following are examples of possible channels: a voice call from a landline phone; a voice call from a cell phone; a voice or video call using a third-party communications platform (e.g., Skype, Google Hangouts, and Apple Facetime, where each third-party platform may be a separate channel); SMS or MMS messaging; or a third-party messaging platform (e.g., Facebook Messenger, Apple Business Chat, or Twitter, where each third-party platform may be a separate channel).

Channels may be grouped by their capabilities. For example, a voice channel includes any channel that allows communications by voice, and a text channel includes any channel that allows communications using text messages, and some channels may be both voice and text channels. A company may communicate with a single customer over multiple channels, for example according to the preferences of the customer or the objectives of the communications session. A company may also communicate with a customer over multiple channels simultaneously.

Machine learning tools may be used to facilitate various aspects of conversations. In some conversations, one end of the conversation may be automated using machine learning tools. For example, for a text channel, an algorithm may generate text messages to send to a person, and for a voice channel, an algorithm may generate speech to be presented to a person. In some conversations, machine learning tools may be used to assist a person in the conversation, such as by suggesting text for a person to type or automatically providing information relevant to the conversation.

In some situations, it may be desired to change the channel of the communication or to switch between customer support provided by a human agent and automated customer support. For example, a person receiving customer support over the phone may lose the connection and desire to resume the conversation using a text channel. For another example, a person may be speaking with a human agent and the human agent may transfer the person to automated customer support because automated customer support is available to resolve the customer's support issue.

Accordingly, a variety of types of transitions may occur. A first type of transition is a transition from a first channel with a human agent to a second channel with a human agent. For example, a transition from text support to voice support, a transition from voice support to text support, a transition from a first type of text support (e.g., Apple business chat) to a second type of text support (e.g., SMS), or a transition from a first type of voice support (e.g., Skype) to a second type of voice support (e.g., phone call). A second type of transition is a transition from a first channel with an automated agent to a second channel with an automated agent (any of the channel transitions described above). A third type of transition is a transition from receiving support from an automated agent to receiving support from a human agent (any of the channel transitions described above including remaining on the same channel). Finally, a fourth type of transition is a transition from receiving support from a human agent to receiving support from an automated agent (any of the channel transitions described above including remaining on the same channel). In addition to the above, a transition may include a transition from a first channel to both a first channel and a second channel. For example, a customer may communicate simultaneously over a text channel and a voice channel.

FIG. 1 is an example system 100 for transitioning a customer support session between different channels and also for transitioning between a human agent and an automated agent.

In FIG. 1, customer 110 may be seeking customer support from a company. The company may allow the customer to obtain support over a variety of channels (such as any combination of text, audio, or video). A customer may have multiple devices that he can use to obtain support, such as a customer text device 111 that allows the customer to send text messages to the company or a customer voice device 112 that allows the customer to communicate with the company using voice. A customer may have a single device the supports both text and voice (e.g., a smartphone) and may have multiple devices that support one or both of text and voice communications (e.g., land line phone, personal computer, tablet, etc.).

The customer may accordingly seek support using a variety of devices and channels and may seek (or be assigned to) a support session with a human agent or an automated agent. As part of the support session, the customer device may establish a connection with API (applications programming interface) server 120 of the company. Although a company may have different servers for different types of support requests, for clarity of presentation, FIG. 1 illustrates a single API server 120 for handling support requests of customers.

API server 120 may include any appropriate technology for communicating with a customer, such as firewalls, load balancing, and the like. API server 120 may be in communication with a variety of other components for assisting the customer support process. For example, when customer 110 is communicating over a text channel and receiving support from an automated agent, API server 120 may communicate with automated text support component 131 that is able to process the text message received from the customer and provide an appropriate response. Similarly, when customer is communicating over a voice channel and receiving support from an automated agent, API server 120 may communicate with automated voice support component 132.

A company may have multiple human agents for providing support to a customer. A human agent may provide one or both of support over a text channel or support over a voice channel. In FIG. 1 text agent 151, text agent 152, text agent 153, voice agent 161, voice agent 162, and voice agent 163 are available to provide support to customers. When customer 110 is receiving support from a human agent, API server 120 may connect the customer with a text agent or a voice agent according to the communication channel used by the customer.

A company providing customer support services may use machine learning techniques to improve the customer support process. FIG. 1 illustrates machine learning component 140 that may be used facilitate both automated support and support by a human agent. For example, with automated support, machine learning techniques may be used to understand a communication from a customer and then generate a response and/or perform an action as part of the support process. With support by a human agent, machine learning techniques may be used to assist the human agent. For example, machine learning may be used to provide automatic completions to text entered by the agent, suggest responses for an agent to send to a customer, or automatically provide resources relevant to the subject matter of the conversation, such as the customer's billing history or a manual for the cable modem of the customer.

The machine learning techniques may include any of the techniques described in U.S. Pat. Nos. 9,715,496; 10,109,275; U.S. Publication Application Publication 2018/0374029; U.S. Pat. No. 10,083,451; U.S. Publication Application Publication 2019/0019197; U.S. Pat. No. 9,892,414; U.S. patent application Ser. No. 15/836,110; U.S. patent application Ser. No. 15/863,225; U.S. Pat. Nos. 10,210,244; 10,097,690; 10,169,315; U.S. patent application Ser. No. 16/035,062; U.S. patent application Ser. No. 16/054,473; U.S. patent application Ser. No. 16/189,584; U.S. Provisional Patent Application Ser. No. 62/777,434; U.S. patent application Ser. No. 16/252,063; and U.S. Provisional Patent Application Ser. No. 62/800,099; each of which is hereby incorporated by reference.

During a customer support session, the customer may transition to a different channel or between support from a human agent and an automated agent. The transition may occur for a variety of reasons, such as the following: the customer wishes to transition to a different channel for his own convenience; a phone call was dropped; the issue of the customer may more easily be resolved on a different channel; the company may suggest that the customer transition from a voice channel to a text channel to reduce costs; or the company may suggest that the customer transition from human to automated support for the convenience of the customer and to reduce costs.

During a customer support session on a particular channel, various computations may be performed by processing the communications of the session. In some implementations, mathematical models or machine learning models, such as neural networks, may process the text or audio of a conversation. For example, machine learning models may be used to determine an intent of a communication received from a customer, to determine a sentiment of a customer, to suggest a message for a human agent to send to a customer, or any of the applications of mathematical models described herein or in the patents and applications incorporated by reference. The computations may be used and updated throughout a customer support session.

When the customer transitions from a first channel to a second channel, it may be desired to use results of the computations that were performed with the first channel after the transition to the second channel. Accordingly, cache 160 may be used to store computations performed during a customer support session with a first channel so that the computations may be used after the transition to a second channel, as described in greater detail below.

A company may desire to store logs of customer support sessions with customers. A log of a customer support session may include text of messages exchanged during the session, a transcript of audio of the session, and other information, such as information about user interfaces presented to a customer or actions performed. Different channels may have different capabilities in presenting information to customers.

In addition to the differences between text and audio channels, two different text channels may have different capabilities. For example, some text channels may allow only the exchange of text, such as SMS messages. Other text channels, such as a text chat embedded in a web page, may allow for enhanced content, such as presenting forms or one or more buttons to the customer.

A company may have different sets of logs for different channels, but having different logs for different channels may make it more difficult and/or more computationally intensive to obtain all logs for a specific customer. To facilitate the use of multiple channels, a company may desire to use a universal log format that allows the storage of interactions with a customer in a single location regardless of the capabilities of the channel with which the communications occurred. Accordingly, a company may use universal logs data store 170 for storing logs across multiple or all available channels.

Channel Transitions with a Human Agent

Figure 2B:
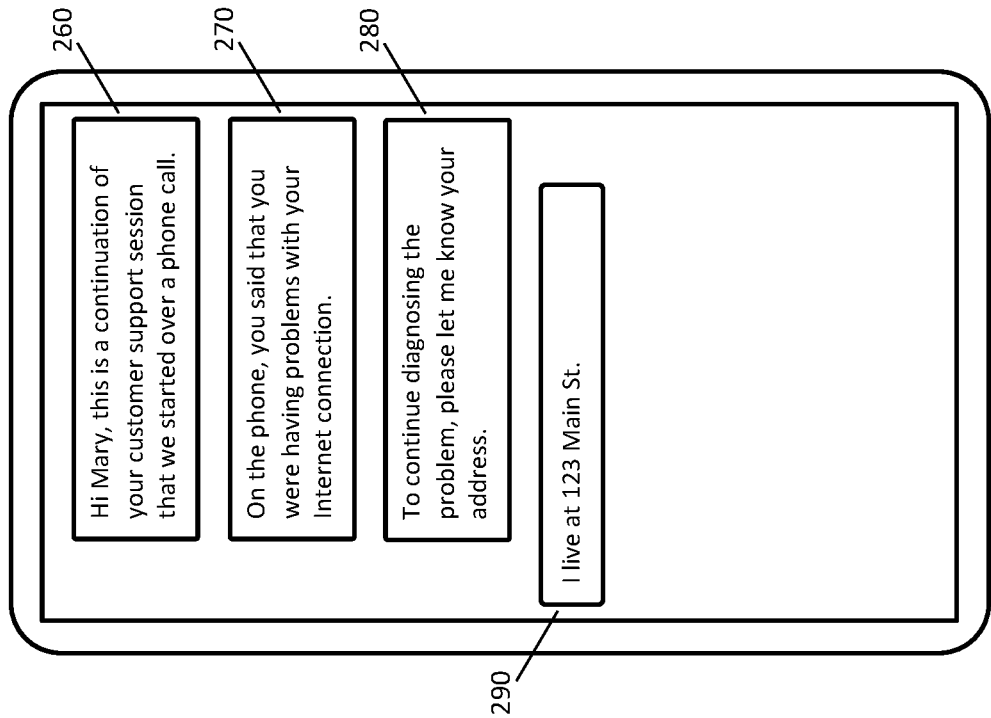
FIG. 2B is an example user interface for a text channel.
Figure 2A:
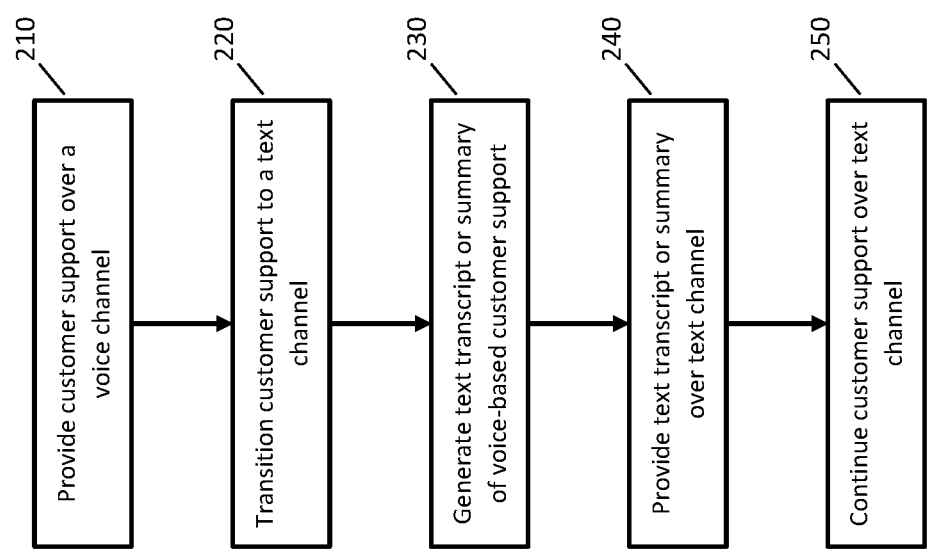
FIG. 2A is an example method for transitioning a customer from a voice channel to a text channel.

In some implementations, a customer may be having a conversation with a human agent on a first channel, and the session may transition to second channel with the same human agent or possibly a different human agent. FIGS. 2A and 2B illustrate an example where customer transitions from voice support to text support.

In FIG. 2A, at step 210, customer support is provided to a customer over a voice channel. For example, the customer may have called a phone number of a company seeking support. At step 220, the customer support is transitioned to a text channel. For example, the customer or the company may request that the support process be continued over a text channel. The support process may transition to a text channel using any appropriate techniques. For example, the customer may access text support on the company's website or support may continue using SMS messaging.

To facilitate the transition from the voice channel to the text channel, it may be desired to present to the customer a transcription or a summary of what occurred on the voice channel. Where there is some delay in transitioning from the voice channel to the text channel, the transcription or summary may refresh the customer's memory. At step 230, a text transcript or summary of the voice-based support is generated, and at step 240, the text transcript or summary is presented to the customer over the text channel. In some implementations, the transcriptions may be generated for each communication as they are received.

FIG. 2B illustrates example messages that may be presented on the text channel. Message 260 informs the customer that the support session on the voice channel is being continued on the text channel, and message 270 provides a summary of what occurred on the voice channel.

At step 250, the support session continues on the text channel with the customer and the human agent exchanging text messages. For example, in FIG. 2B, message 280 is a message from the human agent to continue the support process, and message 290 is a response from the customer.

Figure 3:
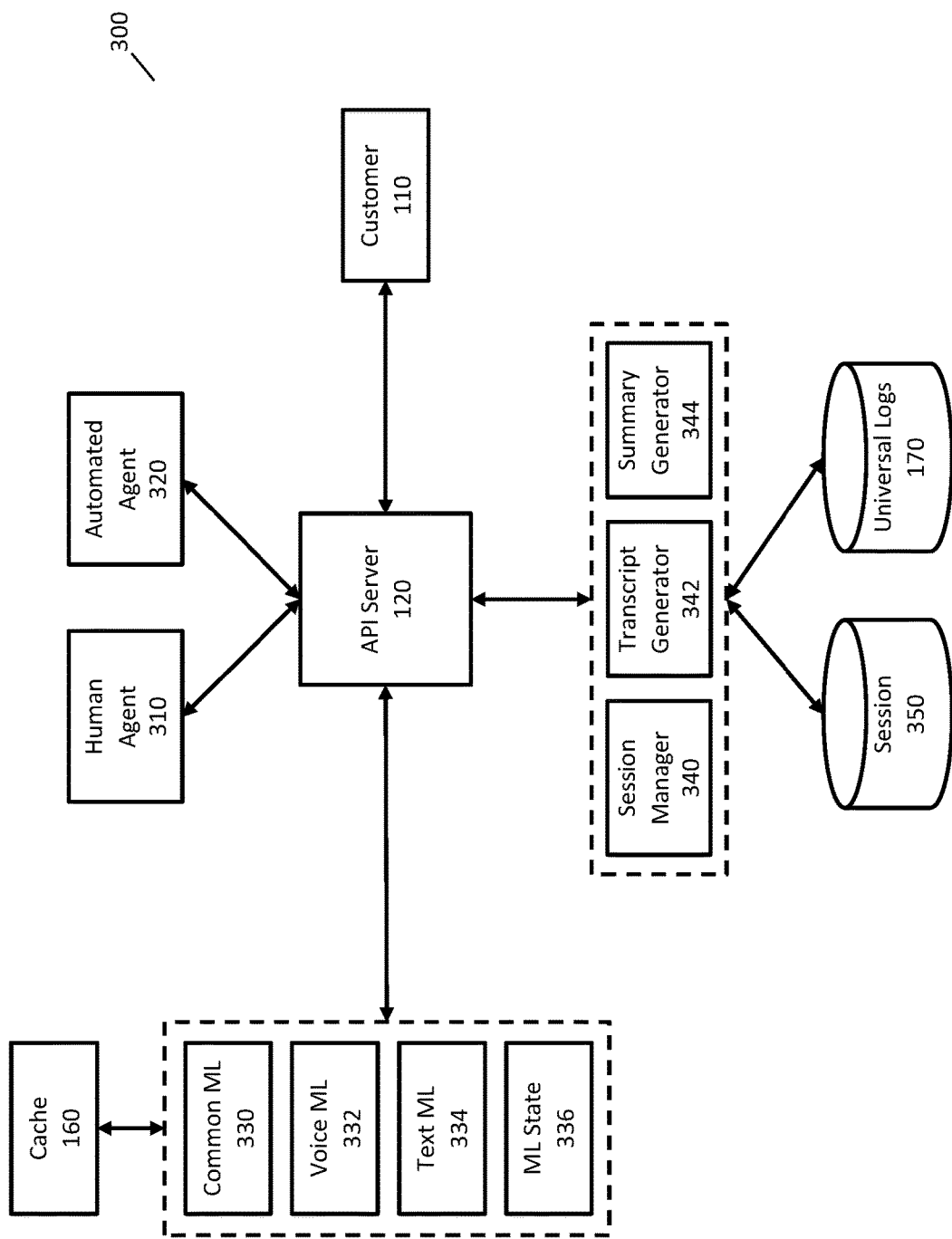
FIG. 3 is an example system for transitioning a customer support session from a first channel to a second channel.
Figure 4:
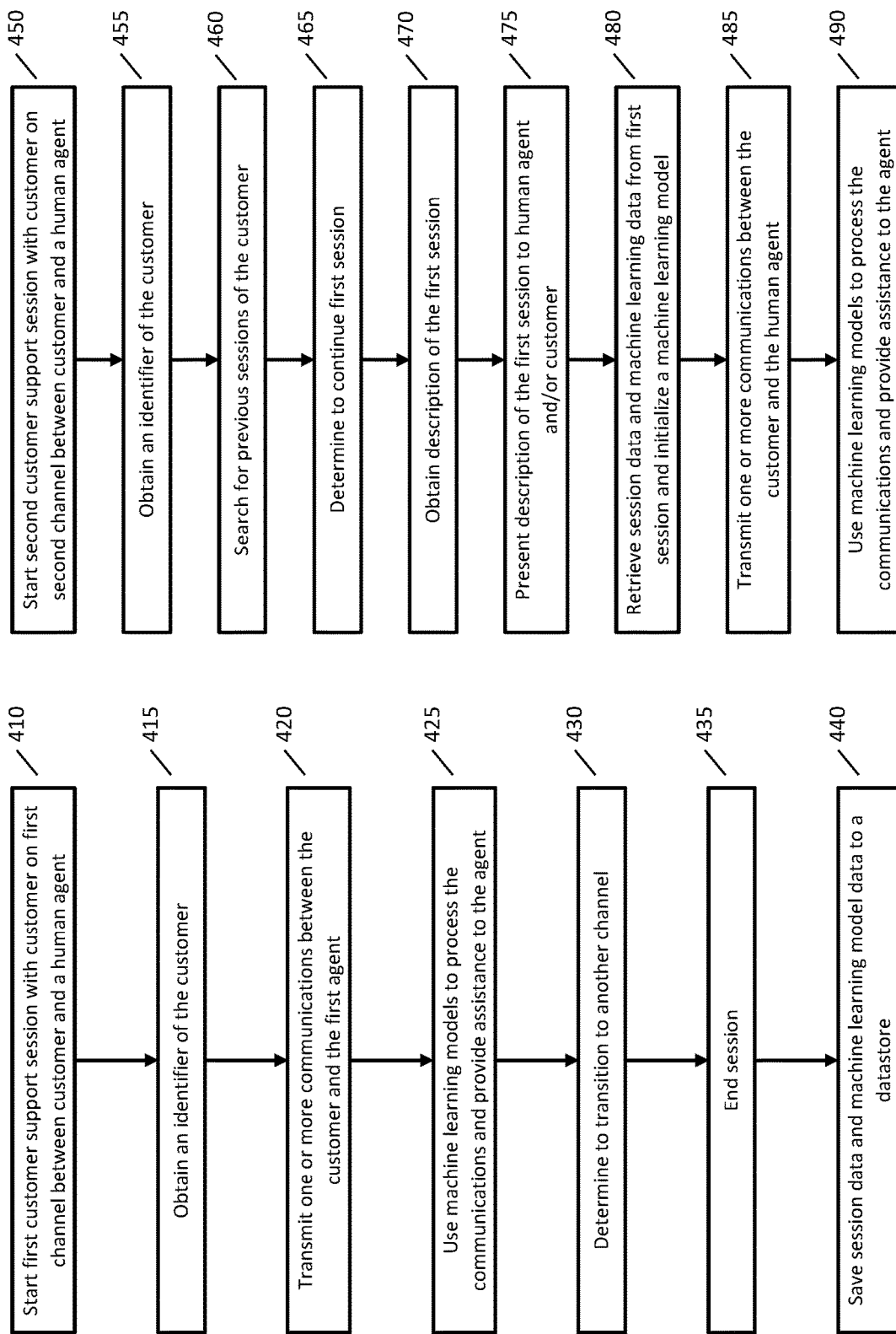
FIGS. 4A and 4B are example methods for transitioning a customer support session from a first channel to a second channel.

More generally, a customer may be transitioned from any type of first channel to any type of second channel. FIG. 3 is an example system 300 for transitioning a customer support session with a customer from a first channel to a second channel, and FIGS. 4A and 4B are example methods for transitioning the customer from a first channel to a second channel.

At step 410 a first customer support session with a customer is started on a first channel where the support session is between a customer and a human agent. For example, customer 110 of FIG. 3 may use a voice channel to establish a connection with API server 120. At step 415, an identifier of the customer who started the support session is obtained. In some implementations or instances, a customer identifier may be available as soon as the session is started. For example, if the customer is logged into a web page of the company and the customer is requesting support via the web page, then a customer identifier may be included in the customer support request. Where the customer identifier is not included in the support request, any appropriate techniques may be used to obtain a customer identifier. For example, the customer may be asked to provide a user name and password.

API server 120 of FIG. 3 may perform any appropriate actions to start the customer support process, such as creating a new customer support session and connecting the customer with a human agent (e.g., human agent 310). In creating a new customer support session, API server 120 may use session manager component 340. Session manager component 340 may be configured to perform any appropriate actions to create the session. For example, session manager component 340 may create an entry in session data store 350 that includes an identifier of the session, an identifier of the customer, an identifier of the human agent assigned to the customer support session, and any other appropriate information.

At step 420, one or more communications are transmitted between the customer and the human agent. For example, the customer and human agent may speak to each other if the first channel is a voice channel or transmit text messages if the first channel is a text channel.

At step 425, the communications are processed with one or more machine learning models to provide assistance to the customer or the human agent. Any appropriate machine learning models may be used, such as artificial neural networks, support vector machines, Bayesian networks, or genetic algorithms. The machine learning models may process any appropriate data, such as text or audio of communications, data from a customer profile, or any other data available to the company. The machine learning models may implement any appropriate functionality, such as any of the functionality described herein or in the patents and applications incorporated by reference.

In some implementations, for a text channel, the machine learning models may process each character as it is entered by a customer or agent, and suggest completions to what is being typed. For example, the suggested completions may be presented near the entered text, and the user may select a suggested completion and send it. In some implementations, the machine learning models may process communications and suggest complete messages for a user to send to another. In some implementations, the machine learning models may process communications and suggest resources that are relevant to the conversation. For example, where the customer and agent are discussing a problem with a modem, a link to a manual for the modem may be presented to the customer and/or agent.

In some implementations, some machine learning models may be used with more than one channel, and some machine learning models may be specific to a particular channel. Further details of the machine learning models described below may be found in the patents and applications incorporated by reference.

The following are examples of machine learning models that may be used with more than one channel: a machine learning model to process text of communications and compute a context vector that describes the context of the conversation; and a machine learning model that processes input relating to the conversation (e.g., a context vector computed by the previous machine learning model) and selects one or more resources as being relevant to the conversation (e.g., a manual for a modem).

The following are examples of machine learning models that may be specific to a text channel: a machine learning mode that processes individual characters as they are being entered by a user and suggests completions to the text being entered; a machine learning model that processes input relating to the conversation (e.g., a context vector as described above) and suggests communications for a person to transmit to the other person.

The following are examples of machine learning models that may be specific to a voice channel: a machine learning model that converts speech to text; a machine learning model that processes audio to determine a sentiment of the speaker; and a machine learning model that converts text to speech.

In some implementations, an instance of a machine learning model may be created for a customer support session. For example, a first machine learning model may have a definition, such as a type of the model (e.g., convolutional neural network, recurrent neural network, support vector machine), parameters (e.g., number and size of layers), and initialization values (e.g., values for individual neurons). When the first customer support session starts, an instance of the first machine learning model may be created on a server computer that is assigned to the first session. The first instance of the first mathematical model may be created using the definition of the mathematical model described above. In some implementations, the first instance of the first mathematical model may exist only for the duration of the first session and may be removed from memory at the end of the session.

In FIG. 3, common machine learning models 330 may represent models that may be used in more than one channel, voice machine learning models 332 may represent machine learning models that are specific to a voice channel, and text machine learning models 334 may represent models that are specific to a text channel. Machine learning models may be further specific to a specific channel (e.g., a Skype call) or other characteristics of channels (e.g., video channels or channels that support both voice and text).

The machine learning models may be combined in any manner that is appropriate for a channel. For example, the output of a voice or text machine learning model may be the input to a common machine learning model, and the output of a common machine learning model may be the input to a voice or text machine learning model.

The combination of the common machine learning models 330, voice machine learning models 332, and text machine learning models 334 may be used to provide any of the functionality described above, such as a suggesting a resource to a human agent or a customer.

At step 430, it is determined to transition to another channel. The transition to another channel may be based on any appropriate reason. For example, the customer may request to continue the conversation on a different channel or the company may suggest that the conversation be continued on a different channel. In some implementations or instances, there may not be an explicit determination to transition to another channel. For example, the cell phone connection with the customer may be dropped, and the customer may reconnect using a different channel. For another example, after the end of the session, the customer may realize that his issue was unresolved or not fully addressed and reconnect with a different channel.

At step 435, the session is ended. Any appropriate techniques may be used to end the session. For example, the connection may be interrupted (e.g., dropped call), the customer may end the session, or the agent may end the session. In some implementations or instances, the session may not be ended, and the customer may participate over two channels simultaneously.

At step 440, session data and machine learning model data are saved to a data store so that the data may be reused in future sessions. Any appropriate session data and machine learning model data may be saved, and the data may be saved in any appropriate location, represented by cache 160. For example, the data may be saved in a database stored on disk, an in-memory database, or a hybrid database (mix of in-memory and disk storage). For example, session data and machine learning model data may be saved to a data store by machine learning state component 336.

Any appropriate session data may be stored at step 440. For example, the session data may include an identifier of the customer, other information about the customer (e.g., the customer's name or other information from a customer profile), text of communications of the session, timestamps relating to the session, an identifier of issues addressed during the session, information indicating whether individual issues were resolved during the session, and a state of a workflow (described in greater detail below).

Any appropriate machine learning model data may be stored at step 440. For example, the machine learning model data may include values of individual neurons of a neural network (e.g., in the form of an internal state vector), values input to a machine learning model, and values output by a machine learning model. For example, a first machine learning model may compute and output a first value, and a second machine learning model may process the first value as input. This first value may be stored so that it may later be processed by another neural network. For another example, a first neural network may perform processing, and in performing this processing, individual neurons of the neural network may take values corresponding to a state of the neural network. The values of the individual neurons may be stored so that another neural network may be initialized to have the same state as the first neural network.

The storage of session data and machine learning model data may be performed at any appropriate times. In some implementations, updates to the session data and machine learning model data may be stored to the data store throughout the session. For example, after each instance of a machine learning model performing processing (e.g., after each communication is processed), the machine learning model data may be stored in the data store. In some implementations, the session data and machine learning model data may be stored at less frequent intervals or only at the end of the session.

Turning to FIG. 4B, at step 450, a second customer support session is started on a second channel where the support session is between the customer of FIG. 4A and a human agent. The human agent may be the same agent as the human agent from FIG. 4A or a different human agent. At step 455, an identifier of the customer is obtained. Steps 450 and 455 may use any of the techniques described above for steps 410 and 415.

The second channel may a same type of channel as the first channel or may be a different type. For example, where the first channel is a voice channel over a phone call, and the call is disconnected, the user may call back, and the second channel may also be a voice channel over a phone call. For another example, the first channel may be a voice channel and the second channel may be a text channel. For another example, the first channel may be a text channel (e.g., SMS) and the second channel may be a different type of text channel (e.g., a customer support interface on a web page).

At step 460, a search is performed for previous sessions of the customer. In some implementations, session information may be stored in a session data store 350, and the identifier of the customer may be used to search session data store 350 for current or previous session of the customer. For example, session manager component 340 may perform the search of session data store 350.

At step 465, it is determined that the second session is a continuation of the first session of FIG. 4A. Although the second session is a different session from the first session, the determination is that it is expected that the second session will continue the subject matter addressed in the first session. For example, that the second session will address the same customer support issue that was addressed in the first session.

Any appropriate information may be used to determine that the second session is a continuation of the first session. For example, the determination may be based on one or more of the following factors: that a timestamp of the first session is close to a current time (e.g., the first session is ongoing or recently ended); that the first session was terminated unexpectedly (e.g., a phone call was dropped); that an issue of the first session was not resolved; comparing the content of a communication of the second session to the contents of the communications of the first session (e.g., the customer sending communications about the subject matter of the first session); or asking the customer (using a human or automated agent) if the customer would like to continue the subject matter of the first session.

Any appropriate techniques may be used to determine that the second session is a continuation of the first session. In some implementations, a rule-based approach may be used. For example, if a first session is within 5 minutes of the current time, it may be determined that the second session is a continuation of the first session. In some implementations, a machine learning model may process information about the second session and the first session and determine if the second session is a continuation of the first session. For example, a neural network or a support vector machine may process any of the information described herein and output a decision as to whether the second session is a continuation of the first session.

At step 470, a description of the first session is obtained. For example, the description may be a transcript of the first session or a summary of the first session. In some implementations, transcript generator component 342 may be used to generate a transcript of the first session. For example, transcript generator component 342 may retrieve text or audio of the first session from universal logs data store 170 and generate the transcript from the text or audio. In some implementations, summary generator component 344 may retrieve text or audio of the first session from universal logs data store 170, and generate text that summarizes the content of the first session. For example, summary generator component 344 may implement any of the techniques described in the patents and applications incorporated by reference.

At step 475, the description of the first session is presented to one or both of the customer and the human agent of the second session. For example, where the session is a text session, text of description may be presented to the customer or the agent. Where the session is a voice session, generated speech of the description may be presented to the customer or the agent (or text may be presented to the agent in an agent user interface).

Steps 470 and 475 are optional and may not be performed in some implementations or some instances. In some implementations, the description of the first session may depend on the type of channel or other circumstances. For example, for a text channel, the description may be a transcript, and for a voice channel, the description may be a summary. For another example, steps 470 and 475 may be skipped where a time between the first session and the second session is less than a threshold or if the first and second sessions are being conducted simultaneously.

At step 480, session data and machine learning data from the first session are retrieved from the data store, such as cache 160. The session data and the machine learning data may be used to initialize one or more machine learning models. For example, a second instance may be created of the first machine learning model described above at step 425. The second instance may be initialized, for example, by setting the values of individual neurons of the second instance from the machine learning data, performing other initialization steps, or by setting session data or machine learning data may as the input to the second instance and processing the session data or machine learning data to initialize the second instance.

At step 485, one or more communications are transmitted between the customer and the human agent. Step 485 may use any of the techniques described above for step 420.

At step 490, the communications are processed with one or more machine learning models to provide assistance to the customer or the human agent. Step 490 may use any of the techniques described above for step 425.

The second session may then continue until it is terminated. In some instances, the customer may start a third customer support session on a third channel, and it may be determined that the third customer support session is a continuation of the second customer support session. In some instances, where the first and second sessions are being conducted simultaneously, the second session may end, and the customer may continue on the first session. For example, it may be preferred to conduct some aspects of a customer support session (e.g., authentication or submission of a credit card number) on a particular type of channel, and the second session may be used to accomplish those aspects, and then processing may return to the first session.

The above processing may provide numerous advantages to improve the customer support process. Determining that a second customer support session is a continuation of a first customer support session may improve the experience for the customer and may also reduce customer support costs. By searching for and finding first session and determining that the second session is a continuation of the first session, the information from the first session may be immediately available to the human agent who is assisting the customer. Accordingly, the customer may not need to again explain the customer support issue that was the subject matter of the first customer support session. Furthermore, since the information of the first customer support session is immediately available, the second customer support session may be conducted more quickly, thus freeing the human agent to assist other customers and reducing customer support costs for the company.

In some aspects, storing the session data and the machine learning model data from the first session and retrieving the data for the second session may improve the performance of the machine learning models. Improving the performance of the machine learning models may provide improved assistance to the customer and human agent and thus more quickly resolve the customer's issue. Resolving the issue more quickly may provide greater satisfaction for the customer and reduced customer support costs for the company.

Channel Transitions with an Automated Agent

A customer may also receive customer support via an automated agent. An automated agent may be preferable in some instances because the customer may receive assistance more quickly (e.g., without waiting on hold) and it may reduce customer support costs for the company.

In some implementations, automated support may resemble communications with a human agent in that the customer may communicate using natural language (e.g., text or voice) and receive automated natural language responses. In some implementations, where the support process allows the customer to communicate using natural language, the customer may be able change the direction of the conversation at any time. For example, the customer may initially communicate about a first support issue and then desire to instead communicate about a second support issue.

In some implementations, automated support may use natural language to identify the issue of the customer, and the support process may then continue with an automated workflow, where the automated workflow may implement communications that are more structured, such as selecting among choices, answering questions, and filling in forms. For example, natural language may be used to identify that the customer needs to provide an updated credit card, and then an automated workflow may be used to obtain the credit card number, expiration date, and the three-digit card verification code (CVC). In some implementations, the automated support process may include a combination of natural language communications and an automated workflow.

An automated workflow may be implemented using any appropriate techniques. An automated workflow may be implemented, for example, using logic that describes the information that needs to be obtained from the customer and a procedure for obtaining the information. In some implementations, an automated workflow may be implemented using a decision tree, a directed graph, a finite state machine, or finite state transducer where processing may at a node of the tree or graph and continues to a subsequent node according to a communication or information received from the customer. When all required information has been received, the workflow may be complete.

In some implementations, an automated workflow may include list of needed information items and instructions for requesting each of the information items from the customer and processing responses of the customer to recognize the requested information. The workflow may iterate over the needed information items and request each of them from the customer.

A state of a workflow may be used indicate the progress of the workflow. For example, where a workflow obtains a set of information items from a customer, the state of the workflow may include one or more of the information items for which values have been received, the values of the received information items, and information items for which values have not yet been received. Nodes of a tree or graph may be associated with a state.

The process of understanding a communication from a customer may be referred to intent detection or recognition. A company implementing an automated support system may categorize the communications it expects to receive from customers into a fixed number of defined intents. By categorizing communications into intents, it may be easier for the company to provide an automated response. For example, a YES intent may include a variety of ways of communicating agreement (e.g., "yes", "ok", "that's good", etc.). To provide a response, it may be sufficient to know the intent of the communication, and the specific manner in which the intent was expressed may not be important.

To determine an intent of a communication, a company process a received communication with a mathematical model, such as an intent classifier. The mathematical model may provide an output that indicates the intent of the communication from a list of possible intents or that indicates that the communication does not match any intent of the list of intents.

As used herein, an intent is a set of communications that have similar meaning. A company may define a set of intents (such as hundreds, thousands, or more intents), and the intents may be defined using any appropriate techniques. For example, an intent may be defined by a mathematical model that processes communications to determine intents of the communications or by a corpus of training data that was used to create the mathematical model. Because a concept may be expressed using a wide variety of language, an intent may correspond to large number of communications.

An intent may be assigned a label to make it easier for humans to understand the types of communications corresponding to the intent. For example, a YES intent may include messages that express agreement, a NO intent may include messages that express disagreement, and a PAY_BILL intent may include messages that express a desire to pay a bill.

In some implementations, an intent may have slots to allow greater flexibility. For example, where a company sells a large number of products, it may not be feasible to have an intent relating to the purchase of each of the products. Instead, an intent may have a slot (e.g., a parameter or a variable) to allow a single PURCHASE intent to cover the purchase of any product. For example, a PURCHASE intent may have a slot for a product, and when it is determined that a message corresponds to the PURCHASE intent, the communications may also be processed to determine the value of the slot (e.g., the customer would like to purchase a stapler).

The techniques described herein for determining an intent of a communication received form a customer may use any of the techniques described the incorporated patents and applications.

A company may define a set of workflows or issues that are capable of being handled by an automated support process. For example, FIG. 7 is a table with a list of possible workflows that may be handled by an automated support process. Each workflow may have an workflow identifier, an intent that corresponds to the workflow, a list of information items needed from the customer to complete the workflow, and any other appropriate information needed to complete an operation corresponding to the workflow. For example, the table may include a specification of an API call to be performed after all of the required information items have been received from the customer.

In the example of FIG. 7, the first workflow relates to updating a credit card of the customer. This workflow includes a CC_UPDATE intent that corresponds to expected language a customer may use to indicate that they need to update their credit card. The workflow also includes a list of information items needed from the customer to complete the credit card update. The other intents in FIG. 7 relate to updating an address of the customer and assisting the customer in paying a bill.

During an automated support session, the information items needed from the customer may be obtained by processing free-form text, using form fields, or any other appropriate techniques. In some implementations, named entity recognition and other techniques may be used to extract information from a text communication from a user. Named entity recognition techniques may be able to identify that an information item is present in text even if the information item may be presented in a variety of manners. For example, a date may be expressed as "12/6/2020"; "Dec. 6, 2020"; or "the sixth of December next year".

In some implementations, during an automated support session, a communication of a customer may be processed to determine (i) an intent of the communication, (ii) a workflow of an automated support process corresponding to the intent, and (iii) a list of information items corresponding to the workflow. Further communications of the customer may then be processed to identify the information items corresponding to the workflow.

In some implementations, information items may be identified before an intent is determined, or information items may be processed for intents that have not yet been identified. For example, a customer may first communicate "the expiration date is 12/6/2020" and later communicate that he needs to update his credit card. The expiration date may be identified and used even though it was communicated before the update credit card intent was identified. For another example, a customer may indicate that he needs to update his credit card and then state his address. Although the address may not be needed to update the credit card, the address may be recognized and possibly used for future actions corresponding to other intents.

When providing customer support to a customer using an automated agent, it may in some instances be desirable to switch from one channel to another channel. For example, a customer moving from a private location to a public location and may prefer to communicate using text instead of voice. For another example, some support procedures may be more suited to a particular type of channel, such as support on a web page where a greater variety of information may be presented to the customer.

The techniques described above for FIGS. 4A and 4B may also be used when a customer transitions from automated support on a first channel to automated support on a second channel. A customer may start a customer support session on a first channel (e.g., a voice channel) where the support is provided by an automated agent, and an identifier of the customer may be obtained. One or more communications may be transmitted between the customer and the automated agent and the communications may use natural language or be part of a structured automated workflow. The communications between the customer and the automated agent may be processed by one or more machine learning models, for example to determine an intent of a customer communication, identify an information item in a customer communication, or determine the next automated response by the automated agent.

The customer may then choose transition to a second channel or continue the support process using both the first channel and the second channel, such as by using the techniques described above. During the customer support process on the first channel, session data and machine learning model data may be saved to a data store so that the data may be used on other channels.

The customer may then start a second customer support session on a second channel with an automated agent, and the second channel may be a different type of channel than the first channel (e.g., a text channel instead of a voice channel). As above an identifier of the customer may be obtained, the identifier may be used to search for previous support sessions with the customer, and it may be determined that the second session is a continuation of the subject matter of the first session, such as by using any of the techniques described above. In some implementations, a description of the support process on the first channel may be presented to the customer on the second channel, as described above.

The session data and the machine learning data may then be retrieved from the data store and used for the support session on the second channel. For example, the machine learning data may be used to initialize one or more machine learning models, such as machine learning models that identify intents, identify information items, or generate responses to communications from the customer. One or more communications may be transmitted between the customer and the automated agent, and the machine learning models may process the communications. The process may continue until the customer support session is complete or the customer transitions to a third channel.

In some implementations, an automated workflow may be used for automated communications over multiple types of channels. For example, a text channel and a voice channel may both use the same automated workflow in resolving a customer support issue. Because different channels have different capabilities for presenting communications to customers, however, other techniques may be needed for determining how to adapt a single workflow so that it may operate over multiple channels.

For example, as part of an automated workflow, an action to be performed may be to obtain a credit card number from a customer. Because the automated workflow is being used for multiple channels, an implementation of this action may need to be available for each channel of the customer support process.

For a voice channel, the implementation of the action to obtain a credit card number may include the following steps: (i) present speech to the customer asking the customer to say their credit card number; (ii) process the speech of the customer to obtain the credit card number; (iii) present speech to the customer asking the customer to say the expiration date of the credit card; (iv) process the speech of the customer to obtain the expiration date of the credit card; (v) present speech to the customer asking the customer to say the CVC; and (vi) process the speech of the customer to obtain the CVC.

For a text channel that is limited to transmitting text, the implementation of the action to obtain a credit card number may include steps similar to the steps for the voice channel except that text may be transmitted and processed instead of speech. For a text channel that is able to prevent a greater variety of user interface elements (e.g., a customer service chat implemented on a web page), a form may be presented to the customer to allow the customer to enter the credit card number, expiration date, and CVC. The customer may provide all the information requested by the form and then select a button to submit the form. Similarly, action implementations may be implemented for other channels and for other actions that may be performed with an automated workflow.

Other aspects of an automated workflow may have different implementations for different types of channels. In some implementations, a channel implementation may be configured to resend a communication if a response has not been received from a customer. For example, with a voice channel, if a response has not been received from a customer within 5-10 seconds, an additional voice communication may be sent to the customer to repeat the previous communication or ask if the customer is still there. For a text channel, an implementation may wait for a longer period of time (since it may be more typical for the customer to do something else during the session) or may wait indefinitely for the customer to respond (or until the communications session is ended).

In some implementations, a channel implementation may be configured to allow the customer to interrupt a communication being transmitted, otherwise referred to as allowing the customer to "barge in". For example, with a voice channel, a voice communication being presented to a customer may last on the order of seconds. While this communication is being presented, the customer may speak, and the voice channel may be configured to stop presenting the communication and instead receive and process the communication of the customer. For a text channel, the transmission of a communication may be nearly instantaneous, and thus the text channel may not need any functionality relating to barge in.

In some implementations, the order of requesting information and/or the quantity of information (e.g., number of information items) may be different for different channels. For example, with a voice channel, a communication may simply ask the customer which plane ticket the customer would like to purchase and allow the customer to specify any relevant information (e.g., departure location, departure date and time, destination, etc.). With a text channel, the customer may instead be asked to provide information items one at a time.

In some implementations, various channel implementations may provide additional functionality for customers or agents. For example, for a text channel, machine learning tools may be used to provide the customer or the agent with features, such as automatic suggestions of completions of text being entered by a user or automatic suggestions of complete messages to send. For a voice channel, such features may be less useful or difficult to implement and thus may not be provided.

Figure 5:
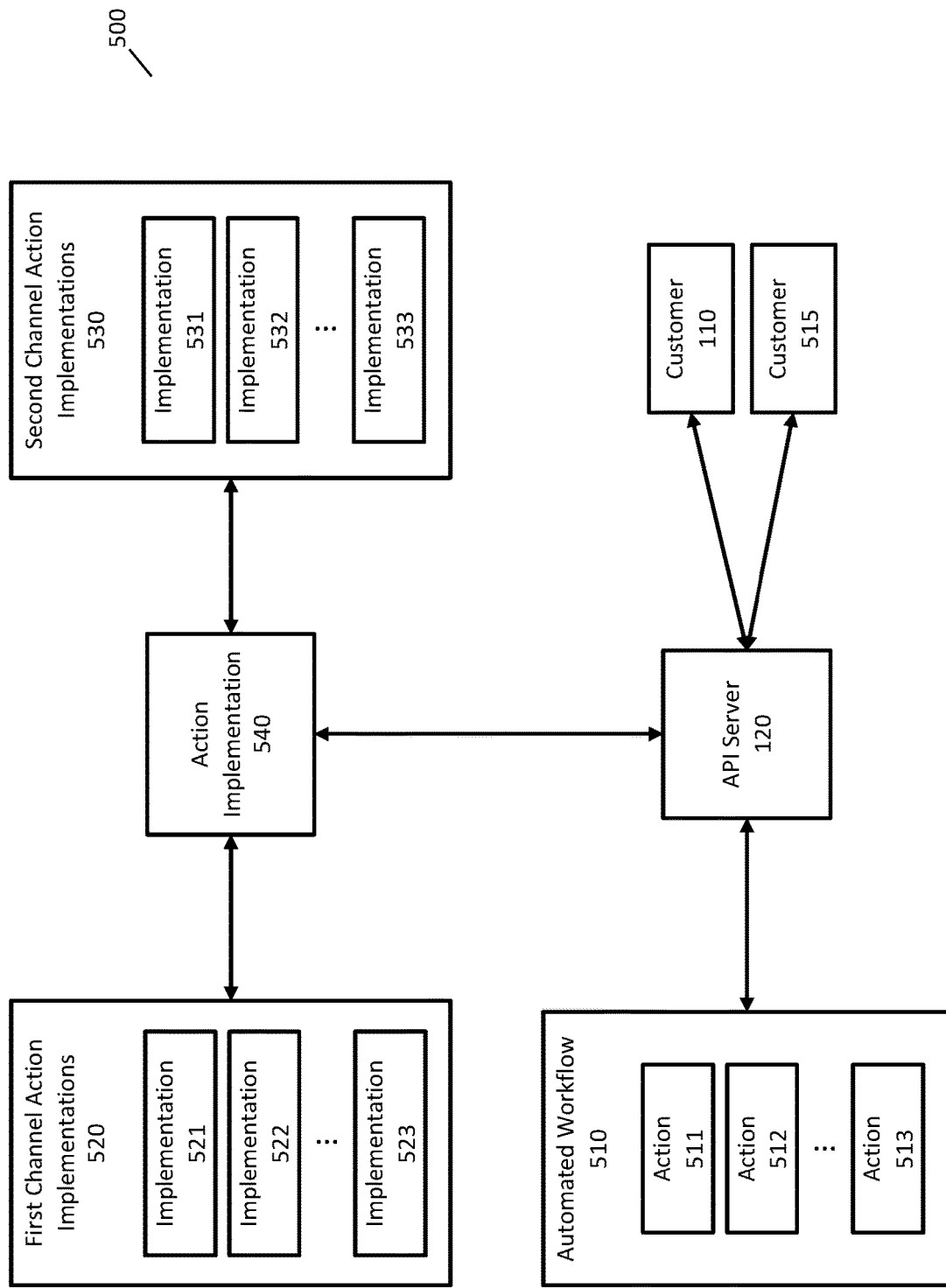
FIG. 5 is an example system for implementing an automated agent over multiple channels.
Figure 6:
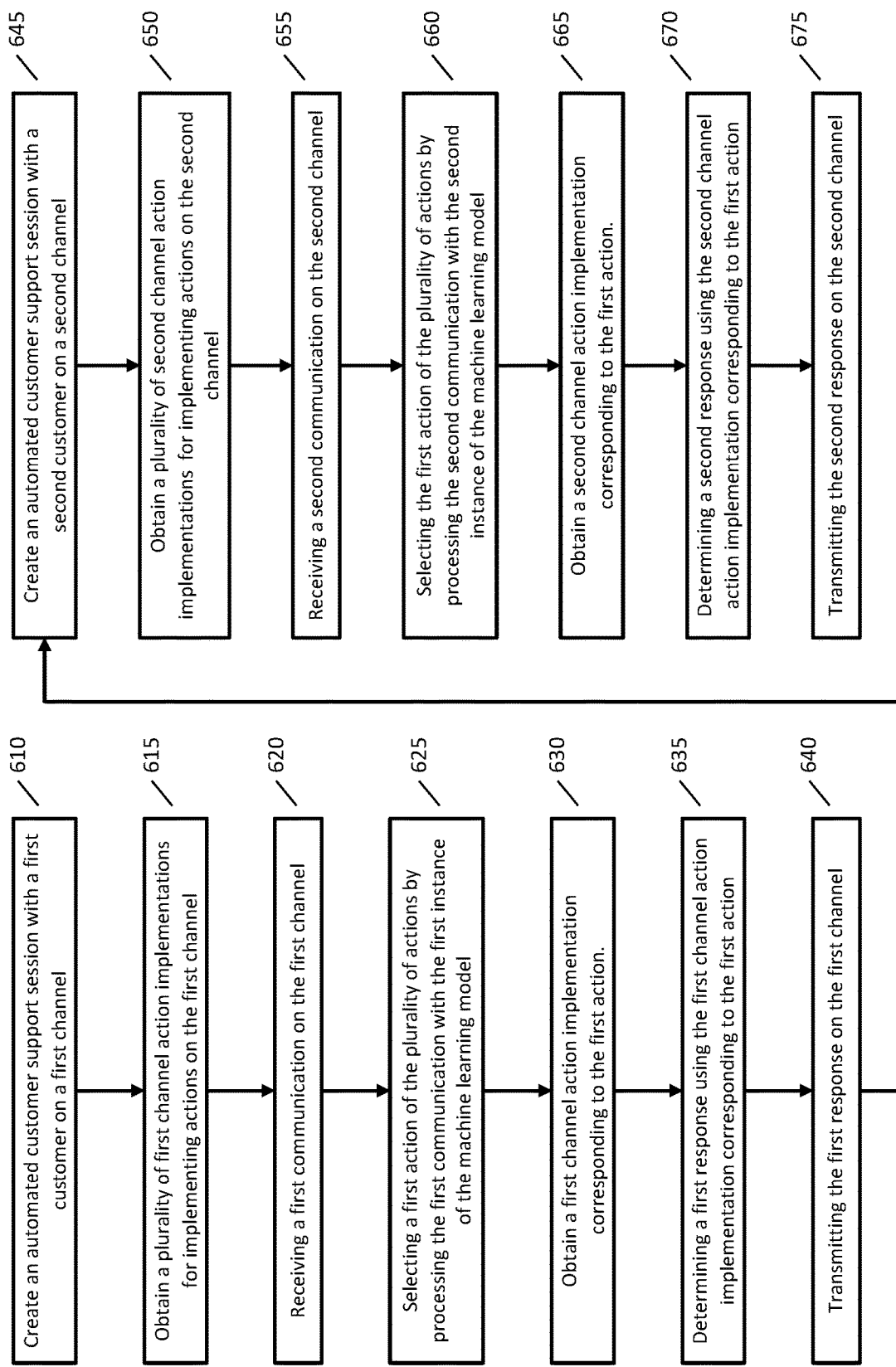
FIG. 6 is an example method for implementing an automated agent over multiple channels.

FIG. 5 is an example system 500 for implementing an automated workflow over multiple channels, and FIG. 6 is an example method for implementing an automated workflow over multiple channels.

In FIG. 5, one or more customers may be receiving customer support via an automated workflow, and an automated workflow may be implemented using any of the techniques described herein. For example, customer 110 may be receiving automated support over a first channel and customer 515 may be receiving automated support over a second channel. Although customer 110 and customer 515 may be receiving automated support over different channels, the same automated workflow may be used over both channels.

At step 610, an automated customer support session is created for assisting a first customer over a first channel. The automated customer support session may use an automated workflow, and the automated workflow may be configured to process one or more communications from a customer and determine an action to be performed, such as any of the actions described above.

FIG. 5 includes automated workflow 510 that includes action 511, action 512, and action 513, and these actions may include any of the actions described herein. API server 120 may create one or more instances of automated workflow 510, and use the instances to determine actions to be performed in response to communications received from a customer.

At step 615, a plurality of first channel action implementations are obtained for implementing actions on the first channel. FIG. 5 includes first channel action implementations 520 for implementing actions of automated workflow 510 on the first channel. Each of the first channel action implementations may correspond to an action of an automated agent. For example first channel action implementation 521 may correspond to action 511, first channel action implementation 522 may correspond to action 512, and first channel action implementation 523 may correspond to action 513. The relations between actions and action implementations may or may not be a one-to-one correspondence.

A first channel action implementation may be implemented using any appropriate techniques. For example, a first channel action implementation may be specified using structured data that provides information about the implementation of the action. The structured data may include an identifier of the action being implemented; an identifier of the channel where the implementation is to be used; a specification of a communication to be presented to a user (e.g., using a template); a specification of a sequence of communications corresponding to the action; a list of information items to be obtained from the customer; a form to be presented to the customer; an API call to update the company servers in response to completing the action (e.g., an API call to charge the customer's credit card).

At step 620, a first communication is received from the first customer on the first channel. For example, API server 120 may receive the first communication from customer 110. At step 625, a first action of the plurality of actions is selected by processing the first communication with the automated workflow. For example, API server 120 may use automated workflow 510 to select the first action.

In some implementations, the first action may be obtained using a state of the workflow and/or a directed graph. The first communication may be processed to obtain information that is present in the communication, such as a credit card number or the customer expressing agreement. The information may be obtained from the communication using any appropriate techniques, such as identifying an intent from text of the communication or by performing named entity recognition on text of the communication. The information obtained from the communication may be used to update a state of the workflow, such as by updating the state to indicate that information has been received from the customer. In some implementations, the information received from the customer or the updated state may cause the workflow to traverse from a first node to a second node of a tree or a directed graph. For example, the workflow may be configured to proceed from a first node to a second node based on the information received or the updated state. The first action may then be selected using one or both of a current node of the graph or a current state of the workflow. For example, a mapping may be created from the state and/or node to the actions of the workflow.

At step 630, a first channel action implementation is obtained that corresponds to the first action selected at step 625. For example, API server 120 may, receive the selected first action from automated workflow 510, use action implementation component 540 to obtain the first channel action implementation corresponding to the first action. API server 120 may provide action implementation component 540 with the first action and an indication that the first channel is being used. Action implementation component 540 may then obtain the first channel action implementation from first channel action implementations 520.

At step 635, a first response is determined using the first channel action implementation obtained at step 630. For example, action implementation component 540 may generate a text or speech communication using the first channel action implementation obtained at step 630. Action implementation component 540 may perform any other appropriate tasks, such as filling variables or slots of template and performing API calls to update servers of the company.

At step 640, the first response is transmitted to a customer. For example, audio of speech may be transmitted across a voice channel, text may be transmitted across a voice channel, or structured data (e.g., JSON, XML, or HTML) may be transmitted to update a user interface of the customer.

The processing above may be performed for any number of channels and for any number of customers. The processing may be simultaneous for different customers as different customers may be seeking support at the same time. Steps 645 to 675 may perform similar processing as described above for a second customer on a second channel, such as customer 515 of FIG. 5.

At step 645, an automated customer support session is created for assisting a second customer over a second channel. The automated customer support session may use the same automated workflow that was used at step 610 for processing communications on the first channel.

At step 650, a plurality of second channel action implementations are obtained for implementing actions on the second channel. FIG. 5 includes second channel action implementations 530 for implementing actions of automated workflow 510 on the second channel. Each of the second channel action implementations may correspond to an action of an automated agent. For example, second channel action implementation 531 may correspond to action 511, second channel action implementation 532 may correspond to action 512, and second channel action implementation 533 may correspond to action 513. The relations between actions and action implementations may or may not be a one-to-one correspondence. In some instances, an action implementation for the second channel may be the same as or similar to an action implementation for the first channel (e.g., two different text channels with similar capabilities).

At step 655, a second communication is received from the second customer on the second channel. At step 660, the first action of the plurality of actions is selected by processing the second communication with the second instance of the automated workflow. Note that the first action selected here is the same first action that was selected at step 625 (e.g., both the first customer and the second customer are being asked to provide a credit card number). At step 665, a second channel action implementation corresponding to the first action is obtained. At step 670, a second response is determined using the second channel action implementation obtained at step 665. Although the same first action is being performed, the first response at step 635 is configured for the first channel and the second response at step 670 is configured for the second channel. At step 675, the second response is transmitted to the customer. Steps 645 to 675 may use any of the techniques described above for steps 610 to 640.

A customer receiving support via an automated workflow may also transition from a first channel to a second channel during the customer support process, such as using any of the techniques described herein. For example, the first customer may be receiving support via the automated workflow on the first channel, and session data (that may include, e.g., the state of the automated workflow) may be saved to a data store. The first customer may then transition to a second channel to continue the support process. On the second channel the session data may be retrieved from the data store and used to initialize an instance of the automated workflow used for the second channel. The customer may then continue the support process on the second channel using the automated workflow without having to repeat the actions that were performed on the first channel.

Accordingly, an automated workflow may be used to implement actions with customers over multiple channels. Using the same automated workflow on multiple channels may reduce the costs of automated support as it may be less expensive and time consuming to implement a single automated workflow than to implement a separate automated workflow for each channel. Using the same automated workflow over multiple channels may also improve the performance of the automated workflow. For example, where the same automated workflow is used for both text and voice channels, both voice and text data may be used to train the automated workflow. Having a larger corpus of training data available to train the automated workflow may improve the accuracy of the models used in the automated workflow.

Channel Transitions from an Automated Agent to a Human Agent

Another type of transition is a transition from a customer receiving support from an automated agent to receiving support from a human agent. For such a transition, the customer may remain on the same channel or the customer may switch to a different channel. For example, the customer may prefer to receive support from a human agent instead of an automated agent or the customer's issue may not be appropriate for any of the available automated support procedures.

The techniques described above for FIGS. 4A and 4B (and also the techniques described above for adapting FIGS. 4A and 4B for channel transitions with an automated agent) may also be used when a customer transitions from receiving support from an automated agent to receiving support from a human agent.

During a session with an automated agent, the session data and the machine learning model data may be saved to a data store as described above. When the customer transitions to receiving support from a human agent, the session data and machine learning data may be used to initialize an instance of one or more machine learning models as described above.

In some implementations, a description (e.g., a summary or a transcript) of the automated support between the customer and the automated agent may be presented to the human agent who is now assisting the customer. For example, a summary or transcript of the automated session may be presented as described above. In some implementations, a description of the automated support session may include information about one or more intents identified during the automated support session and information items identified during the support session. Scores or probabilities may be associated with each of the intents and information items identified during the automated session.

For example, the communications of the automated session may be processed, and the following identified: a first intent for updating a credit card with a score of 91 out of 100; a second intent for making a payment with a score of 9 out of 100, and a credit card number with a score of 99 out of 100. The human agent may then use this information to assist the customer, and so that the customer does not need to repeat information that was already provided. For example, that human agent confirms with the customer that he would like to update his credit card, explain that the credit card number has already been provided, and then request the expiration date and the three-digit card verification code. Where the customer actually intended to make a payment, then the human agent can assist the customer in making the payment and use the already provided credit card number.

Channel Transitions from a Human Agent to an Automated Agent

Another type of transition is a transition from a customer receiving support from a human agent to receiving support from an automated agent. For such a transition, the customer may remain on the same channel or the customer may switch to a different channel. For example, the human agent may, after identifying the issue of the customer, inform the customer that automated support is available to assist with the issue, and suggest to the customer that he be transferred to automated support.

The techniques described above for FIGS. 4A and 4B (and also the techniques described above for adapting FIGS. 4A and 4B for channel transitions with an automated agent) may also be used when a customer transitions from receiving support from a human agent to receiving support from an automated agent.

During a session with a human agent, the session data and the machine learning model data may be saved to a data store as described above. When the customer transitions to receiving support from an automated agent, the session data and machine learning data may be used to initialize an instance of one or more machine learning models as described above.

In some implementations, during a support session with a human agent, one or more machine learning models may process communications of the session to identify one or both of intents expressed during the session and information items that are included in the communications. These machine learning models may be the same machine learning models that are used during automated support sessions or may be different machine learning models. The identified intents and information items may be used to assist the human agent or facilitate the transfer of a customer to automated support. Although the human agent is receiving the communications, processing the communications with the machine learning models allows for automated extraction of information that may be used as described below.

Figure 8A:

FIG. 8A is an example user interface (UI) that may be used by a human agent in assisting customer. The UI may allow the human agent to assist multiple customers simultaneously. For example, an agent may respond to a first customer and while waiting to hear back from the first customer, the agent may respond to a second customer. The UI may be presented to the agent using any appropriate techniques. An agent may communicate with a customer through the UI using any appropriate techniques, such as typing a message, speaking a message that is transcribed to text using speech recognition, or speaking with the customer through an audio connection (such as a VOIP connection). For clarity of presentation, the following description will use text communication as an example, but the same techniques may also be used when communicating by speech.

FIG. 8A includes a customer list portion 810, that may include a list of customers that the agent is currently communicating with. FIG. 8A also includes conversation portion 820 that allows the agent to see messages typed by a customer, type messages to the customer, and see the conversation history. FIG. 8A also includes an information portion 830 that provides additional information to assist the agent, such as a customer profile, billing information, or the status of company services.

In some implementations, information portion 830 may be used to present information obtained from the communications by processing the communications with machine learning models. For example, information portion 830 may present intents and information items that the machine learning models identified in the communications along with scores or probabilities corresponding to a likelihood that the identifications are correct.

In some implementations, information portion 830 may include a user interface for completing workflows with the customer or for transferring the customer to automated support for resolving the customer's issue. The intents and information items identified by the machine learning models may be used to assist the human agent in completing an operation corresponding to the workflow or in initializing automated support with the customer.

For example, in FIG. 8A, the customer has written "I need to pay the bill to my account and cancel the movie that was billed to me." The machine learning models may process this communication to identify intents that are present in the communication. In this example, three intents are identified: a pay bill intent with a score of 97 out of 100, a cancel movie intent with a score of 93 out of 100, and an update credit card intent with a score of 31 out of 100. In response to identifying these intents, the UI for information portion 830 may be updated to assist the human agent with completing workflows corresponding to these intents.

In the example of FIG. 8A, information portion 830 includes a UI for completing a workflow corresponding to each of the identified intents. The UI for each workflow includes a list of the information items that are needed to complete the workflow along with buttons to complete the workflow or to transfer the customer to automated support to complete the workflow. Each of the information items is followed by a blank space because the customer has not yet provided the information corresponding to the information items.

As the conversation continues, the human agent may ask the customer to provide further information relating to the customer's requests. For example, the human agent may ask the customer to provide the credit card number to be used to pay the bill. When the customer transmits a communication that includes the credit card number, the machine learning models may process the communication to identify the credit card number, and the credit card number (or a redacted version of it for privacy reasons) may be presented in information portion 830 as shown in FIG. 8B. Because two workflows include an information item for the credit card number, the credit card number may be presented for both workflows.

The human agent may then inform the customer of the amount of the bill, and the machine learning models may process this communication to extract the amount and enter the amount in information portion 830. The machine learning models may accordingly identify information items in communications of the customer and communications of the human agent.

In some implementations, the value of information items may be obtained from sources other than the conversation with the customer. For example, a profile of the customer may include a credit card number and this credit card number may be automatically entered for the Pay Bill workflow and the Update Credit Card workflow. For another example, the amount of the customer's most recent bill or a name or identifier of the customer's most recent purchase of a movie may be obtained from a data store of the company and these values may be presented in information portion 830.

In some implementations, the human agent may be able to enter values in information portion 830 or correct values in information portion 830 (e.g., if there was an error in speech recognition or the named entity extraction).

When all of the values have been obtained for the pay bill workflow, the human agent may then select the Complete Workflow button to cause the customer's credit card to be charged and for the receipt of payment to be indicated in the customer's account.

In some implementations, the human agent may also transfer the customer to automated support to complete a workflow. For example, the customer may also indicate that he would like to update the credit card of his account to the credit card that was just provided to pay the bill. To complete the process of updating the credit card, the expiration date and CVC are needed. To obtain this information and complete the workflow of updating the credit card, the human agent may select the Transfer Customer button to transfer the customer to automated support for updating the credit card.

The automated support for updating a credit card may be initialized with the value of the credit card number that has already been received. Initializing the automated support in this manner allows the automated to use the already provided credit card number and avoid asking the customer to again provide the credit card number. The automated support process may obtain the expiration date and CVC from the customer as described above, and then complete the workflow of updating the credit card number.

Figure 9:
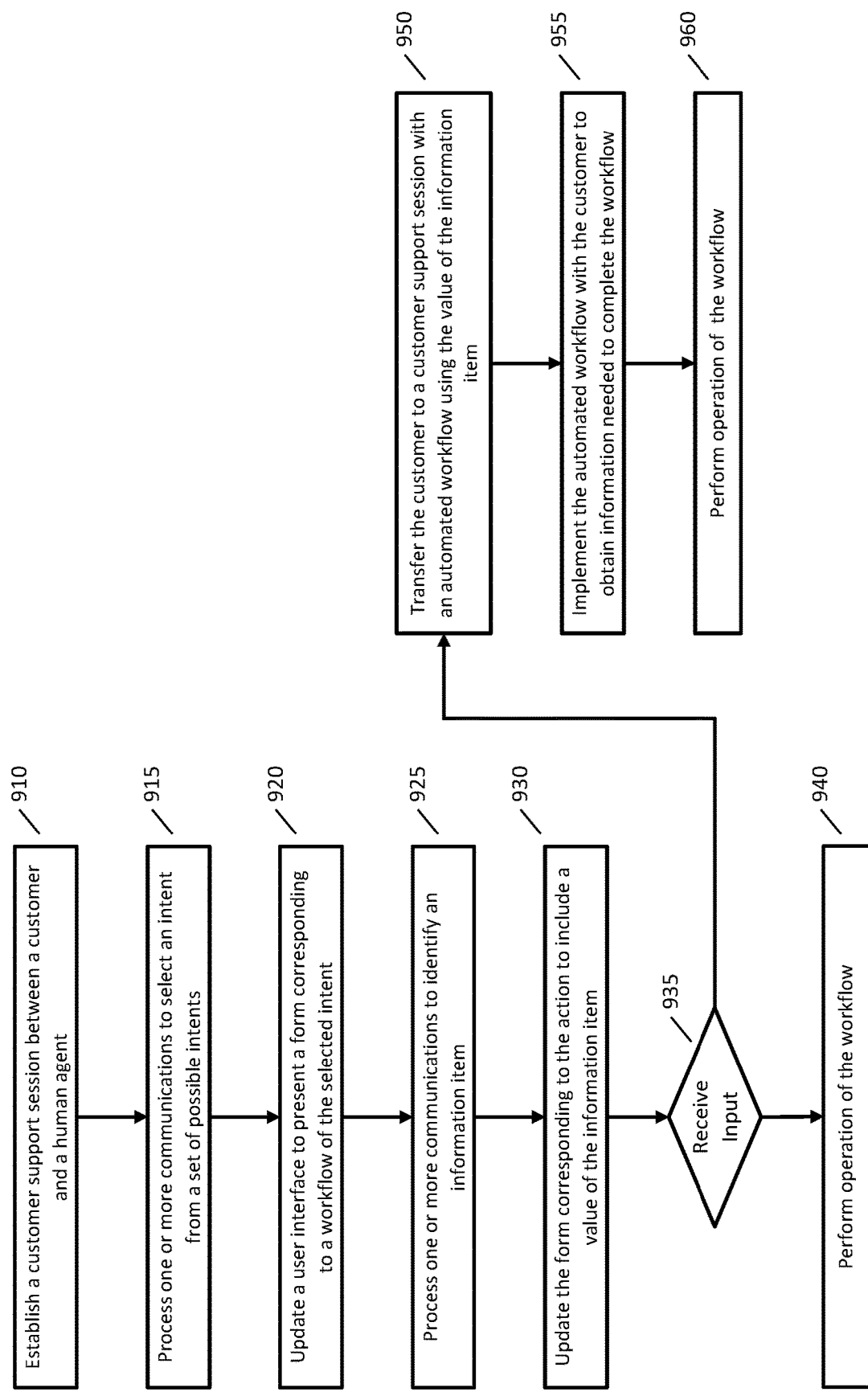
FIG. 9 is an example method for improving customer support by using machine learning models to process communications between a customer and a human agent.

FIG. 9 is an example method for improving customer support by using machine learning models to process communications between a customer and a human agent to identify intents and information items expressed in the communications.

At step 910, a customer support session is established between a customer and a human agent. During the customer support session, the customer may communicate using natural language, such as text messages or speech.

At step 915, one or more communications between the customer and human agent are processed to select one or more intents from a set of possible intents. Any appropriate techniques may be used to identify the intents, such as processing the one or more communications with a machine learning model. For example, the company may create a list of intents it expects customers to express during customer support calls and train machine learning models to identify these intents.

At step 920, a user interface presented to the human agent is updated to present a form corresponding to a workflow of an identified intent. As used herein, a form includes any appropriate techniques for presenting information in a user interface, such as a list of items, a table, or an HTML form. Any appropriate information may be presented about the intents, such as a title, a description of the workflow, a score relating to the identification of the intent, and one or more information items needed to complete the workflow. The form may include buttons to complete the workflow, such as a button to immediately implement an operation corresponding to the workflow (after receiving all information needed to complete the workflow) or a button to transfer the customer to automated support to complete the workflow.

At step 925, one or more communications between the customer and human agent are processed to identify values for one or information items included in the communications. The information items may represent any information that may be used to complete a workflow. For example, the information items may include names, dates, addresses, products or services purchased, or credit card information. Any appropriate techniques may be used to obtain values for the information items, such as processing the one or more communications with a machine learning model or performing named entity recognition. The value of the information item may be represented in any appropriate format, such as text (e.g., the text of an address) or a number (e.g., a credit card number). The communications processed at step 925 may be the same communications processed at step 915 or different communications. Step 925 may occur before step 915, and each of step 915 and step 925 may be performed multiple times to identify additional intents and information items expressed in communications.

At step 930, the user interface presented to the human agent is updated to present the identified information item. For example, a blank space in the form may be replace with the value of the information item identified from the communication.

At step 935, an input is received from the human agent relating to completing a workflow using the identified intent and the identified information items. For example, the input may be the selection a button to complete workflow (which may only be possible if all the information items have been received for the workflow) or may be the selection of a button to transfer the customer to an automated workflow using the identified intent and identified information item.

Where the input received a step 935 is an input to complete the workflow then processing proceeds to step 940 where an operation corresponding to the workflow is performed. Any appropriate techniques may be used to perform the operation. For example, where a required information item for completing the workflow has not been received, an error message may be presented to the human agent, and the operation may not be performed. Where all required information has been received, the operation may be performed, for example, by making an API call to a server, where the API includes an indication of the operation to be performed (e.g., an identifier of the workflow) and the information needed to perform the operation (e.g., credit card number etc.).

Where the input received at step 935 is an input to transfer the customer to an automated workflow, processing may proceed to step 950. At step 950, the customer is transferred to a communications session with the automated workflow for the workflow using the value of the information item identified at step 925. The automated workflow may be obtained for example using an identifier of the workflow. An instance of the automated workflow may be created, for example, using an API call. The instance of the automated workflow be updated to include the value of the information item identified at step 925. In some implementations, an API call may be used (may be the same as the previous API call) to set the value of the information item in the automated workflow. For example, a variable or storage location for a credit card number may be set to the value of the credit card number identified at step 925. The customer may then be connected to the automated workflow using any appropriate techniques.

At step 955, the automated workflow is implemented with the customer to obtain any other information that is needed to complete the workflow. During step 955, logic of the workflow for obtaining a value for the first information item may be bypassed or skipped since a value for the first information item has already been obtained. Any appropriate techniques may be used to implement the automated workflow. In some implementations, the automated workflow may be exchange of natural language communications, where the communications of the customer are processed by a machine learning model and the communications of the automated agent are generated by a machine learning model. In some implementations, the automated workflow may be more structured, such as filling out a form or using interactive voice response (IVR) techniques.

At step 960, after all of the information to implement the workflow has been obtained, an operation corresponding to the workflow is performed. Any appropriate techniques may be used to perform the operation, such as the techniques described at step 940.

In some implementations, the automated workflow may be operating during the customer support session between the customer and the human agent (e.g., during steps 910 to 930). Each of the communications of the customer may be processed by the automated workflow even though the customer is being assisted by the human agent. Accordingly, the automated workflow may be continuously updated during the customer support session even though the human agent is providing responses to the agent and the automated workflow is not (though the responses generated by the automated workflow may be presented to the human agent to provide a suggested response to the human agent). When the customer transitions from receiving support from the human agent to the automated workflow, the automated workflow may already have all the needed information and need not be separately initialized. In some implementations, multiple automated workflows may be operating during the customer support session between the customer and the human agent so that each of the multiple automated workflows may be used without a separate initialization step.

In some implementations, other options may be presented to the human agent for automating parts of the support process. For example, the customer may be transferred to an automated workflow to receive information items from the customer, but the human agent may be able to review or supervise aspects of the automated support process. For example, as the customer is going through the automated workflow, the obtained values of the information items may be presented to the human agent, such as in information portion 830 of FIG. 8B. The human agent may then review the received values, and if needed, request clarification from the customer or make changes. In some implementations, that automated workflow may collect the needed information items but not perform the operation corresponding to the workflow. Instead, after the needed information items have been received, an indication may be presented to the human agent to inform the human agent that all the needed information items for performing the operation of the workflow have been received. The human agent can then review, and cause the operation to be performed, such as by selecting a button to perform the operation.

Processing communications between a customer and a human agent with machine learning models may improve the customer support process for both the customer and the company providing the support. Automatically determining intents and information items from the conversation may reduce the burden on the human agent. By automatically identifying intents, workflows corresponding to those intents may be automatically presented to the human agent so that the human agent does not need to manually find a user interface corresponding to the customer's request. Automatically determining information items and presenting them in the user interface for completing the workflow may reduce the burden on the human agent and also reduce errors where a human agent may inadvertently enter information incorrectly.

Initializing an automated workflow using information obtained in a conversation between a customer and a human agent improves the experience for the customer. The customer saves time in accomplishing his customer support request and is not burdened with providing the same information more than once.

Universal Logs

In implementing the above techniques, communications may be transmitted on different types of channels with different capabilities for presenting information, and communications may be transmitted by a human agent or an automated agent. The following are examples of different types of channels: a voice channel with a human agent; a voice channel with an automated agent where the customer is able to communicate using free form speech; a voice channel with an automated agent using IVR techniques; a text channel with a human agent or an automated agent where only text may be transmitted; and a text channel with a human agent or an automated agent where the channel may display user interface elements in addition to text, such as a form, buttons, or a widget.

A company may desire to record a log of interactions and communications with customers. Because of the different capabilities of different channels, conventional logging techniques may require creating a different logging system and/or database (or other kind of data store) for each type of channel. For example, a company may have a first logging system and a first database for text channels and a second logging system and a second database for voice channels. Maintaining multiple logging systems may increase the costs of implementing a logging system, and may make if more difficult for human agents to review previous interactions with customers since the human agents may need to check multiple logging systems.

To improve the functionality of a logging system and also reduce expenses, a company may implement a universal logging system that is able to provide logging services across all channels and also store the individual log entries in a universal format in a single data store (although the single data store may be distributed and the data may be stored on more than one physical storage device or on multiple storage devices at different locations).

Figure 10:
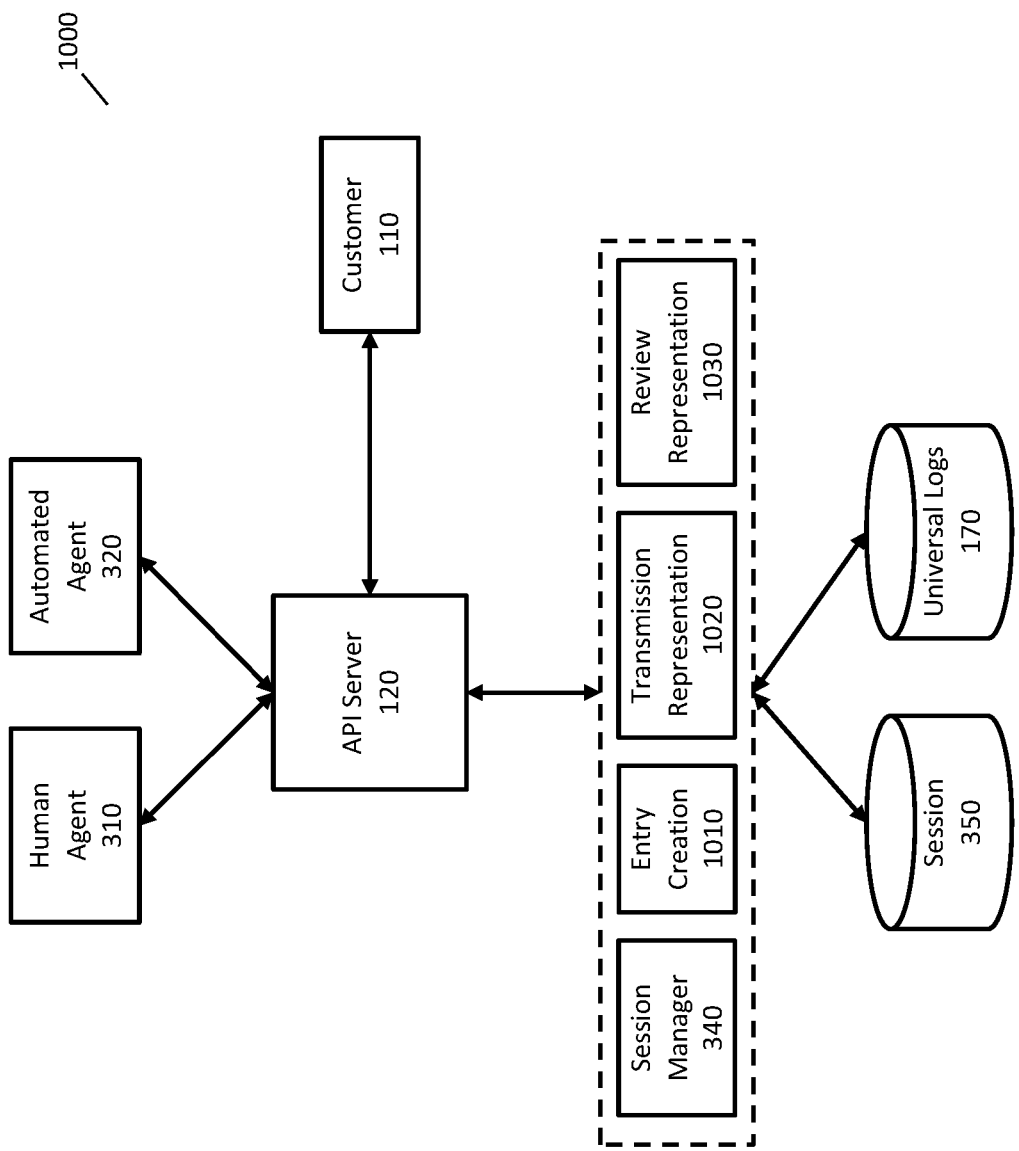
FIG. 10 is an example universal logging system for storing logs for multiple types of channels.
Figure 11:
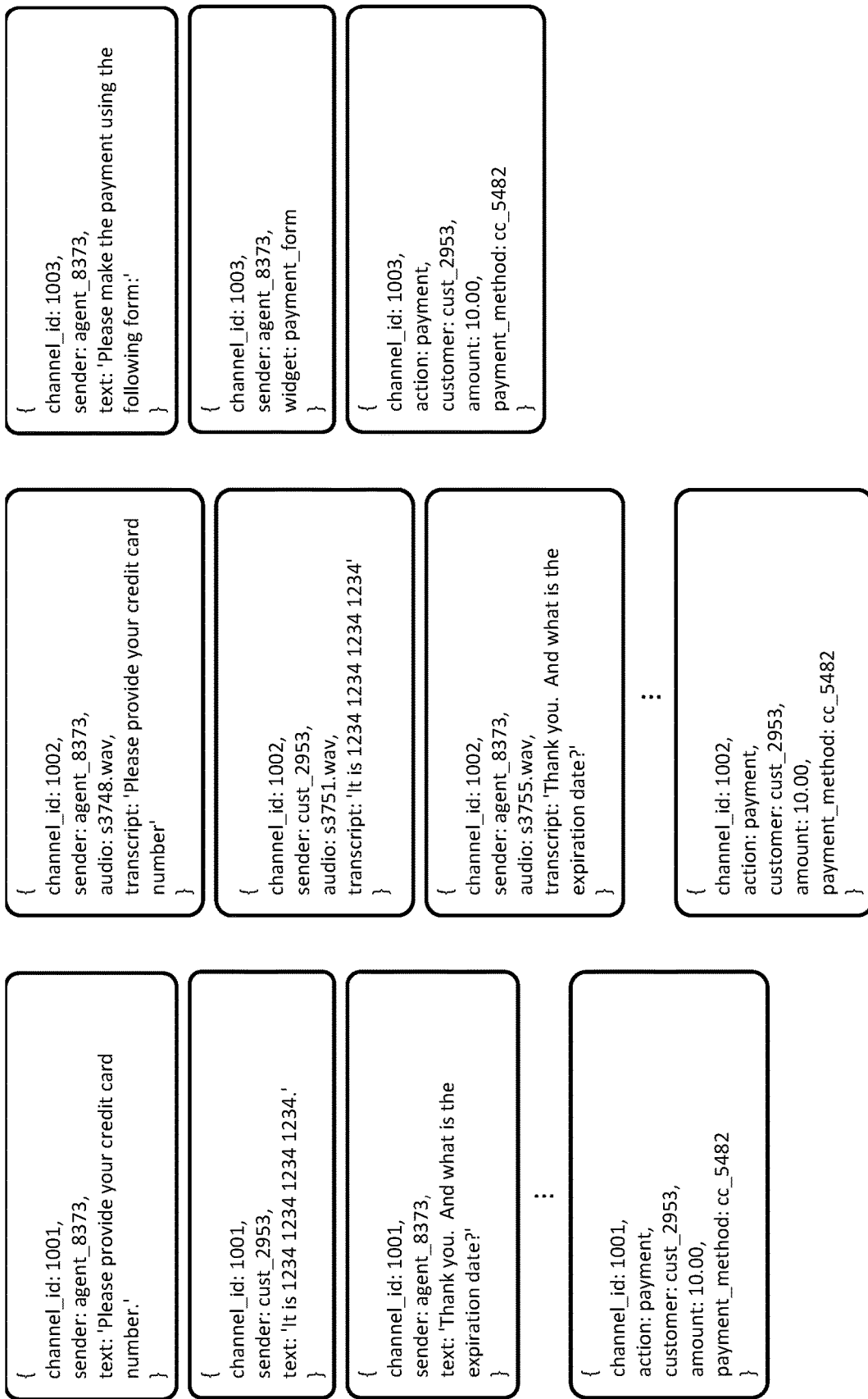
FIGS. 11A-11C are example representations of universal log entries across three channels.
Figure 12:
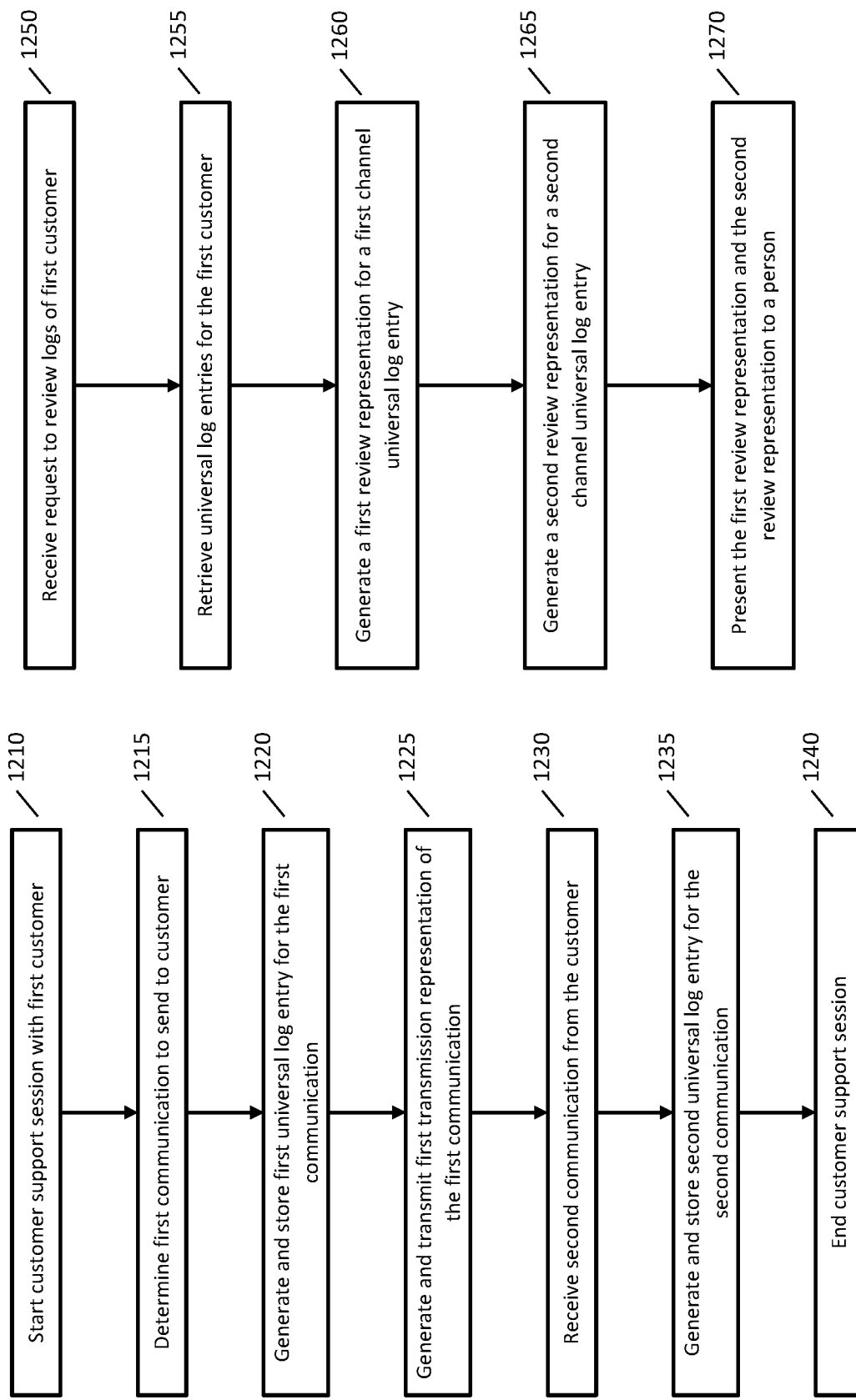
FIGS. 12A and 12B are example methods for implementing a universal logging system.

FIG. 10 is an example universal logging system 1000 for storing logs for multiple types of channels, FIGS. 11A-11C are example representations of universal log entries across three channels, and FIGS. 12A and 12B are example methods for implementing a universal logging system.

In FIG. 10, customer 110 may be receiving support over a customer support session from either human agent 310 or automated agent 320, and the customer support session may occur over any type of channel. In FIG. 10, API server 120 and session manager component 340 may implement any of the functionality described above. Session data store 350 may store data about customer sessions as described above, and universal logs data store may store log entries of customer support sessions over multiple types of channels in a universal format as described in greater detail below.

FIG. 12A is an example method for storing communications of a customer support session using a universal log format and storing the universal format log entries in a data store.

At step 1210 of FIG. 12A a customer support session is started with a first customer. The customer support session may occur over any type of channel, may be with a human agent or an automated agent, and may implement any of the techniques described herein.

At step 1215, a first communication is determined for transmission to the first customer. Where support is being provided by a human agent, the human agent may, for example, type the first communication, speak the first communication, or select a user interface element (e.g., a button) to indicate the first communication.

At step 1220, a first universal log entry is generated for the first communication. A universal log entry may include any relevant information that is useful for later understanding the content of the first communication. A universal log entry may be in any appropriate format, such as structured data (e.g., JSON or XML). The following are examples of information that may be included in a universal log entry: an identifier of the customer, an identifier of the human agent (if present), a n identifier of the channel (e.g., text channel, voice channel, or Apple Business Chat), a session identifier, a timestamp, and information about the content of the first communication.

The content of the first communication may depend on the type of channel and on the specific communication. The following are examples of content that may be stored in a universal log entry: text; an audio file; a transcript of an audio file; an identifier of a form, widget, or user interface element; an action performed (e.g., a payment received from a customer may be a communication that is an action); and data or parameters of the action that was performed.

The universal log entry may then be stored in a data store so that it may be accessed at a later point in time. Any appropriate techniques may be used to generate the universal log entry and store it in a data store. For example, universal log entry creation component 1010 may receive information about a communication generated by a human or automated agent and then create the universal log entry. Universal log entry creation component 1010 or another component, such as session manager component 340, may then store the universal log entry in universal logs data store 170.

FIGS. 11A-C illustrate examples of universal log entries for three different channels. FIG. 11A illustrates universal log entries for a text channel, FIG. 11B illustrates universal log entries for a voice channel, and FIG. 11C illustrates universal log entries for a text channel that supports other user interface elements (e.g., forms and widgets), such as a customer support channel on a web page.

Each universal log entry includes information that makes it possible to present a description of the universal log entry to a person. In some implementations, the universal log entry may include sufficient information to recreate the conversation as viewed by the customer and the agent. These example log entries use JSON format, but any appropriate format may be used for universal log entries.

In FIG. 11A, for the text channel, the first log entry is a text communication from the agent to the customer, the second log entry is a text communication from the customer to the agent, the third log entry is another communication from the agent to the customer, the ellipsis indicates other text communications, and the final log entry describes the action of the customer completing a payment with a credit card. The final log entry indicates that the payment action was performed, the customer who performed the action, the amount of the payment, and the payment method used, such as a credit card identifier.

In FIG. 11B, for the voice channel, the log entries are similar to the log entries for FIG. 11A, except that the log entries include audio files of the communications between the customer and the agent, and for convenience, a transcript of the audio communications that may be obtained using speech recognition.

In FIG. 11C, for the text channel with enhanced content, the universal log entries also describe receiving a payment from the customer, but in a different manner. The first log entry is a text communication from the agent to the customer indicating that the agent will be sending a form to allow the customer to provide payment information. The second log entry indicates that the payment form was transmitted to the customer for presentation on the device of the customer to allow the customer to enter a credit card number, expiration date, and CVC. The third log entry indicates that the payment action was performed when the customer completed and submitted the payment form.

At step 1225, a transmission representation of the first communication is generated. The transmission representation of the first communication is then transmitted to the customer's device over a network connection to cause the customer's device to present the first communication. The generation of the transmission representation may depend on that channel over which the transmission is being sent. For example, for a text channel, the transmission representation may be a format for sending SMS messages; for a voice channel, the transmission representation may be a sequence of UDP packets; and for a text channel with enhanced content, the transmission representation may be a JSON object that is transmitted using the TCP/IP protocol. In some implementations, the transmission representation may be generated from the universal log entry of the first communication. Any appropriate techniques may be used to generate the transmission representation. For example, transmission representation component 1020 may generate the transmission representation, and API server 120 may cause the transmission representation to be transmitted to the customer.

At step 1230, a second communication is received from the customer. The second communication may be received using any appropriate techniques, such as any of the techniques described herein. At step 1235, a second universal log entry is generated for the second communication, and the second universal log entry is stored in a data store. Step 1235 may be implemented using any of the techniques described above.

The customer support session may continue with any number of communications, and at step 1240 the customer support session is ended.

The first customer may request customer support multiple times over different channels, and each customer support session may be implemented as described by FIG. 12A. A universal logs data store will store log entries for the customer from all of the customer support sessions even though the customer support sessions may occur over different channels. Storing all of the customer support sessions in a universal logs data store may facilitate a later review of the log entries.

FIG. 12B is an example method for reviewing log entries of the first customer where the log entries are from customer support sessions over more than one channel.

At step 1250, a request is received to review the log entries of the first customer. For example, a human agent who is currently assisting the first customer may desire to review what happened during previous customer support sessions with the customer. Any appropriate techniques may be used to request to review log entries. For example, the user interface used by a human agent may include a button to see logs of the current customer, or a user interface may allow a person to enter an identifier of a customer or search by customer name to request logs of a customer.

At step 1255, universal log entries for the first customer are retrieved from the universal logs data store. Any appropriate techniques may be used to retrieve the log entries, such as performing a query using an identifier of the customer.

At step 1260, a first review representation is generated for a first channel universal log entry (e.g., a universal log entry that was generated from a customer support session on a first channel). The first review representation may include information that is mostly likely to be helpful to the reviewer and may also present the information from the log entry in a manner so that it may be viewed on the user interface used by the reviewer. For example, for a log entry from a text channel, the first review representation may include the text of the communication; for a log entry from a voice channel, the first review representation may include a transcript of the audio communication and a link to play the audio to the reviewer; and for a text channel with enhanced content, the first review representation may include a description of the enhanced content, such as that the payment form was presented to the customer. Any appropriate techniques may be used to generate the first review representation. Review representation component 1030 may generate the first review representation from the first channel universal log entry.

At step 1265, a second review representation is generated for a second channel universal log entry (e.g., a universal log entry that was generated from a customer support session on a second channel where the second channel is a different channel than the first channel). Step 1265 may be performed using any of the techniques described for step 1260.

At step 1270, the first review representation and the second review representation are presented to a person, such as a human agent. Any appropriate techniques may be used to present the first and second review representations. For example, the first and second review representations may be presented on a web page being used by the person. In some implementations, the first and second review representations may allow for an interactive presentation. For example, the person may request to see additional information about a log entry or to hear audio of a transcription.

The method of FIG. 12B may allow the presentation of logs of customer support sessions of the first customer across any number and type of channels. The method may also be used to view logs of other customers and to simultaneously view logs of multiple customers. For example, a supervisor of a human agent may want to view logs of the human agent assisting customers.

Accordingly, storing log entries from multiple channels in a universal log format in a universal logs data store simplifies the process of allowing a person to view all logs of a customer or all logs of multiple customers. Instead of accessing multiple data stores to view all logs of a customer, a single data store may be accessed and the universal log format may allow the presentation of log entries from multiple channels in a single user interface.

Implementation

Figure 13:
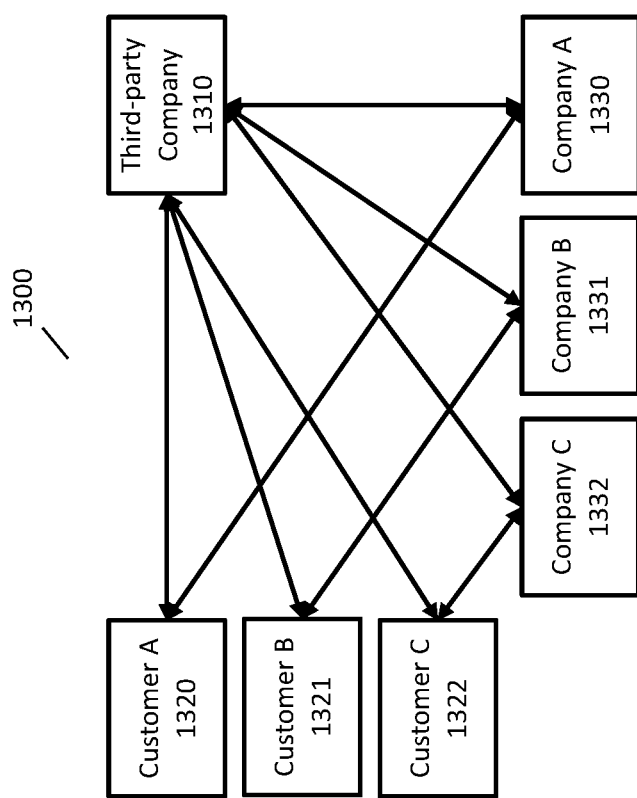
FIG. 13 is an example system for a third-party company to provide services to other companies.

In some implementations, a third-party company may provide services to other companies relating to any of the techniques described herein. For example, a company may allow its customer to obtain customer support over multiple channels, and the company may use services of the third-party company to process communications from customers over multiple channels, allow transitions between channels, store communications in a universal log format, and any of the other techniques described herein. A company may find it more cost effective to use the services of the third-party company than to implement its own services. FIG. 13 illustrates an example architecture that may be used by a company to obtain assistance from a third-party company in communicating with its customers.

FIG. 13 illustrates a system 1300 that allows third-party company 1310 to provide services to multiple companies. In FIG. 13, third-party company 1310 is providing services to company A 1330, company B 1331, and company C 1332. Third-party company 1310 may provide services to any number of companies.

Customers of each company may communicate with a company where the support process uses the services of third-party company 1310. For example, customer A 1320 may be seeking support from company A 1330, customer B 1321 may be seeking support from company B 1331, and customer C 1322 may be seeking support from company C 1332. It may or may not be apparent to the customers whether services of third-party company 1310 are being used.

Third-party company 1310 may assist a company in a variety of ways. In some implementations, third-party company 1310 may assist in connecting a customer with a customer service representative working on behalf of the company. For example, third-party company 1310 may select a customer service representative, may provide a user interface to a customer to make it easier for a customer to request support, and may provide a user interface to a customer service representative to assist the customer service representative in responding to a request of a customer. A customer service representative may have any appropriate relationship with the company on behalf of which it is providing customer support. For example, a customer service representative may be an employee or contractor of a company and providing customer support to only customers of that company, or a customer service representative may be providing services to multiple companies and providing support to customers of the multiple companies at the same time.

The network communications between third-party company 1310, customers, and companies may be architected in a variety of ways. In some implementations, all communications between a customer and a company may be via third-party company 1310 and there may not be any direct connection between the customer and the company. In some implementations, third-party company 1310 may communicate with the company but may not communicate directly with the customer. In some implementations, a customer may communicate directly with the company and also third-party company 1310.

Where a customer is connected to both a company and third-party company 1310, each of the two connections may be used for different kinds of requests. For example, where the customer is interacting with the company in a way that does not require the services of third-party company 1310 (e.g., navigating a web site of the company), the customer may use the network connection with the company. Where the customer is interacting with the company in a way that uses the services of third-party company 1310, the customer may use the network connection with third-party company. It may not be apparent to the customer whether the customer is using a network connection with the company or with third-party company 1310.

Figure 14:
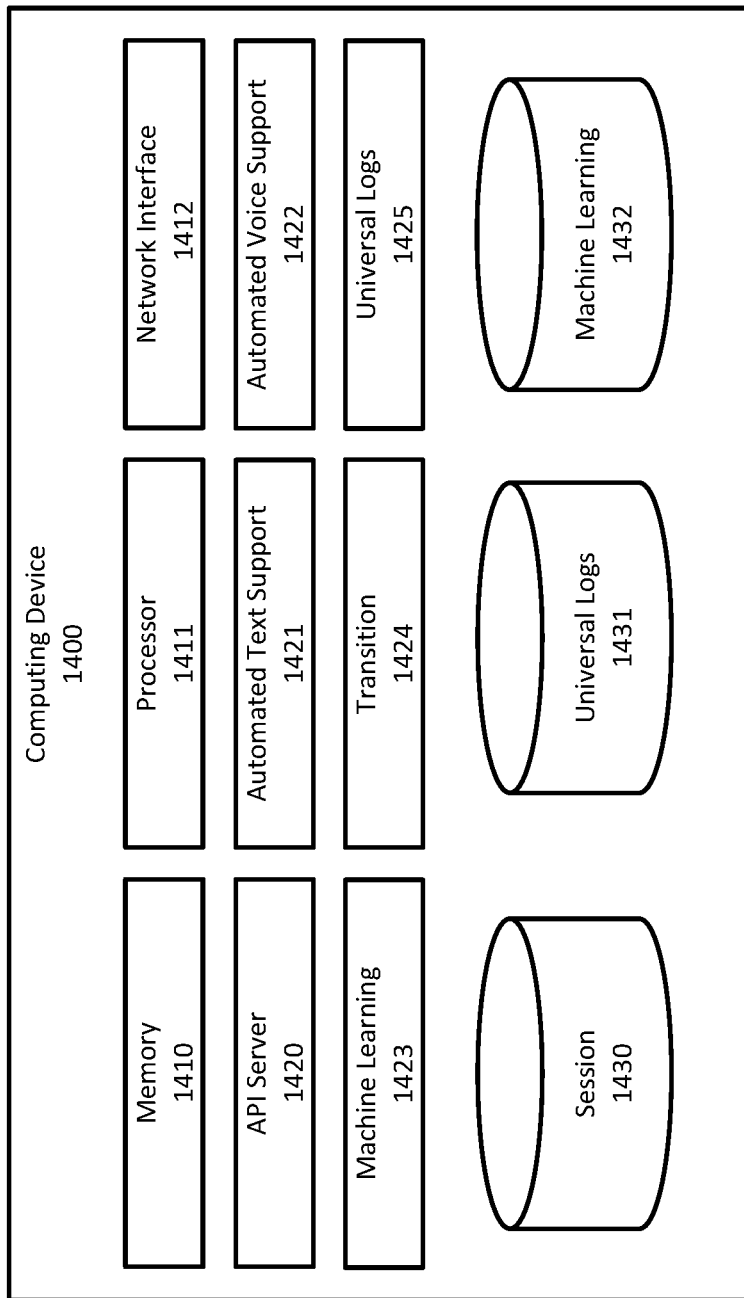
FIG. 14 is an exemplary computing device that may be used to implement any of the techniques described herein.

FIG. 14 illustrates components of one implementation of a computing device 1400 for implementing any of the techniques described above. In FIG. 14, the components are shown as being on a single computing device, but the components may be distributed among multiple computing devices, such as a system of computing devices, including, for example, an end-user computing device (e.g., a smart phone or a tablet) and/or a server computing device (e.g., cloud computing).

Computing device 1400 may include any components typical of a computing device, such as volatile or nonvolatile memory 1410, one or more processors 1411, and one or more network interfaces 1412. Computing device 1400 may also include any input and output components, such as displays, keyboards, and touch screens. Computing device 1400 may also include a variety of components or modules providing specific functionality, and these components or modules may be implemented in software, hardware, or a combination thereof. Below, several examples of components are described for one example implementation, and other implementations may include additional components or exclude some of the components described below.

Computing device 1400 may have an API server component 1420 that may provide any appropriate interface and functionality for providing human and automated support over multiple channels. Computing device 1400 may have automated text support component 1421 that may implement techniques for implementing automated support over a text channel, such as using one more machine learning models to process communications and generate responses. Computing device 1400 may have automated voice support component 1422 that may implement techniques for implementing automated support over a voice channel, such as using one more machine learning models to process communications and generate responses. Computing device 1400 may have machine learning component 1423 that may implement one or more machine learning models using any of the techniques described herein. Computing device 1400 may have a transition component 1424 that may assist in transition a customer between different channels or between automated support and support from a human agent. Computing device 1400 may have a universal logs component 1425 that may generate log entries in a universal format and generate transmission representations and review representations of universal format log entries.

Computing device 1400 may include or have access to various data stores. Data stores may use any known storage technology such as files, relational databases, non-relational databases, or any non-transitory computer-readable media. Computing device 1400 may have session data store 1430 that may be used to store information about customer support sessions, such as any of the information described above. Computing device 1400 may have universal logs data store 1431 that may store log entries from multiple channels in a universal format. Computing device 1400 may have machine learning data store 1432 that may store machine learning model data (such as a state, input, or output of a machine learning model) and session data so that it may be used over customer support sessions on different channels.

The methods and systems described herein may be deployed in part or in whole through a machine that executes computer software, program codes, and/or instructions on a processor. "Processor" as used herein is meant to include at least one processor and unless context clearly indicates otherwise, the plural and the singular should be understood to be interchangeable. Any aspects of the present disclosure may be implemented as a computer-implemented method on the machine, as a system or apparatus as part of or in relation to the machine, or as a computer program product embodied in a computer readable medium executing on one or more of the machines. The processor may be part of a server, client, network infrastructure, mobile computing platform, stationary computing platform, or other computing platform. A processor may be any kind of computational or processing device capable of executing program instructions, codes, binary instructions and the like. The processor may be or include a signal processor, digital processor, embedded processor, microprocessor or any variant such as a co-processor (math co-processor, graphic co-processor, communication co-processor and the like) and the like that may directly or indirectly facilitate execution of program code or program instructions stored thereon. In addition, the processor may enable execution of multiple programs, threads, and codes. The threads may be executed simultaneously to enhance the performance of the processor and to facilitate simultaneous operations of the application. By way of implementation, methods, program codes, program instructions and the like described herein may be implemented in one or more thread. The thread may spawn other threads that may have assigned priorities associated with them; the processor may execute these threads based on priority or any other order based on instructions provided in the program code. The processor may include memory that stores methods, codes, instructions and programs as described herein and elsewhere. The processor may access a storage medium through an interface that may store methods, codes, and instructions as described herein and elsewhere. The storage medium associated with the processor for storing methods, programs, codes, program instructions or other type of instructions capable of being executed by the computing or processing device may include but may not be limited to one or more of a CD-ROM, DVD, memory, hard disk, flash drive, RAM, ROM, cache and the like.

A processor may include one or more cores that may enhance speed and performance of a multiprocessor. In embodiments, the process may be a dual core processor, quad core processors, other chip-level multiprocessor and the like that combine two or more independent cores (called a die).

The methods and systems described herein may be deployed in part or in whole through a machine that executes computer software on a server, client, firewall, gateway, hub, router, or other such computer and/or networking hardware. The software program may be associated with a server that may include a file server, print server, domain server, internet server, intranet server and other variants such as secondary server, host server, distributed server and the like. The server may include one or more of memories, processors, computer readable media, storage media, ports (physical and virtual), communication devices, and interfaces capable of accessing other servers, clients, machines, and devices through a wired or a wireless medium, and the like. The methods, programs, or codes as described herein and elsewhere may be executed by the server. In addition, other devices required for execution of methods as described in this application may be considered as a part of the infrastructure associated with the server.

The server may provide an interface to other devices including, without limitation, clients, other servers, printers, database servers, print servers, file servers, communication servers, distributed servers and the like. Additionally, this coupling and/or connection may facilitate remote execution of program across the network. The networking of some or all of these devices may facilitate parallel processing of a program or method at one or more locations without deviating from the scope of the disclosure. In addition, any of the devices attached to the server through an interface may include at least one storage medium capable of storing methods, programs, code and/or instructions. A central repository may provide program instructions to be executed on different devices. In this implementation, the remote repository may act as a storage medium for program code, instructions, and programs.

The software program may be associated with a client that may include a file client, print client, domain client, internet client, intranet client and other variants such as secondary client, host client, distributed client and the like. The client may include one or more of memories, processors, computer readable media, storage media, ports (physical and virtual), communication devices, and interfaces capable of accessing other clients, servers, machines, and devices through a wired or a wireless medium, and the like. The methods, programs, or codes as described herein and elsewhere may be executed by the client. In addition, other devices required for execution of methods as described in this application may be considered as a part of the infrastructure associated with the client.

The client may provide an interface to other devices including, without limitation, servers, other clients, printers, database servers, print servers, file servers, communication servers, distributed servers and the like. Additionally, this coupling and/or connection may facilitate remote execution of program across the network. The networking of some or all of these devices may facilitate parallel processing of a program or method at one or more locations without deviating from the scope of the disclosure. In addition, any of the devices attached to the client through an interface may include at least one storage medium capable of storing methods, programs, applications, code and/or instructions. A central repository may provide program instructions to be executed on different devices. In this implementation, the remote repository may act as a storage medium for program code, instructions, and programs.

The methods and systems described herein may be deployed in part or in whole through network infrastructures. The network infrastructure may include elements such as computing devices, servers, routers, hubs, firewalls, clients, personal computers, communication devices, routing devices and other active and passive devices, modules and/or components as known in the art. The computing and/or non-computing device(s) associated with the network infrastructure may include, apart from other components, a storage medium such as flash memory, buffer, stack, RAM, ROM and the like. The processes, methods, program codes, instructions described herein and elsewhere may be executed by one or more of the network infrastructural elements.

The methods, program codes, and instructions described herein and elsewhere may be implemented on a cellular network having multiple cells. The cellular network may either be frequency division multiple access (FDMA) network or code division multiple access (CDMA) network. The cellular network may include mobile devices, cell sites, base stations, repeaters, antennas, towers, and the like. The cell network may be a GSM, GPRS, 3G, EVDO, mesh, or other networks types.

The methods, programs codes, and instructions described herein and elsewhere may be implemented on or through mobile devices. The mobile devices may include navigation devices, cell phones, mobile phones, mobile personal digital assistants, laptops, palmtops, netbooks, pagers, electronic books readers, music players and the like. These devices may include, apart from other components, a storage medium such as a flash memory, buffer, RAM, ROM and one or more computing devices. The computing devices associated with mobile devices may be enabled to execute program codes, methods, and instructions stored thereon.

Alternatively, the mobile devices may be configured to execute instructions in collaboration with other devices. The mobile devices may communicate with base stations interfaced with servers and configured to execute program codes. The mobile devices may communicate on a peer-to-peer network, mesh network, or other communications network. The program code may be stored on the storage medium associated with the server and executed by a computing device embedded within the server. The base station may include a computing device and a storage medium. The storage device may store program codes and instructions executed by the computing devices associated with the base station.

The computer software, program codes, and/or instructions may be stored and/or accessed on machine readable media that may include: computer components, devices, and recording media that retain digital data used for computing for some interval of time; semiconductor storage known as random access memory (RAM); mass storage typically for more permanent storage, such as optical discs, forms of magnetic storage like hard disks, tapes, drums, cards and other types; processor registers, cache memory, volatile memory, non-volatile memory; optical storage such as CD, DVD; removable media such as flash memory (e.g. USB sticks or keys), floppy disks, magnetic tape, paper tape, punch cards, standalone RAM disks, Zip drives, removable mass storage, off-line, and the like; other computer memory such as dynamic memory, static memory, read/write storage, mutable storage, read only, random access, sequential access, location addressable, file addressable, content addressable, network attached storage, storage area network, bar codes, magnetic ink, and the like.

The methods and systems described herein may transform physical and/or or intangible items from one state to another. The methods and systems described herein may also transform data representing physical and/or intangible items from one state to another.

The elements described and depicted herein, including in flow charts and block diagrams throughout the figures, imply logical boundaries between the elements. However, according to software or hardware engineering practices, the depicted elements and the functions thereof may be implemented on machines through computer executable media having a processor capable of executing program instructions stored thereon as a monolithic software structure, as standalone software modules, or as modules that employ external routines, code, services, and so forth, or any combination of these, and all such implementations may be within the scope of the present disclosure. Examples of such machines may include, but may not be limited to, personal digital assistants, laptops, personal computers, mobile phones, other handheld computing devices, medical equipment, wired or wireless communication devices, transducers, chips, calculators, satellites, tablet PCs, electronic books, gadgets, electronic devices, devices having artificial intelligence, computing devices, networking equipment, servers, routers and the like. Furthermore, the elements depicted in the flow chart and block diagrams or any other logical component may be implemented on a machine capable of executing program instructions. Thus, while the foregoing drawings and descriptions set forth functional aspects of the disclosed systems, no particular arrangement of software for implementing these functional aspects should be inferred from these descriptions unless explicitly stated or otherwise clear from the context. Similarly, it will be appreciated that the various steps identified and described above may be varied, and that the order of steps may be adapted to particular applications of the techniques disclosed herein. All such variations and modifications are intended to fall within the scope of this disclosure. As such, the depiction and/or description of an order for various steps should not be understood to require a particular order of execution for those steps, unless required by a particular application, or explicitly stated or otherwise clear from the context.

The methods and/or processes described above, and steps thereof, may be realized in hardware, software or any combination of hardware and software suitable for a particular application. The hardware may include a general-purpose computer and/or dedicated computing device or specific computing device or particular aspect or component of a specific computing device. The processes may be realized in one or more microprocessors, microcontrollers, embedded microcontrollers, programmable digital signal processors or other programmable device, along with internal and/or external memory. The processes may also, or instead, be embodied in an application specific integrated circuit, a programmable gate array, programmable array logic, or any other device or combination of devices that may be configured to process electronic signals. It will further be appreciated that one or more of the processes may be realized as a computer executable code capable of being executed on a machine-readable medium.

The computer executable code may be created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software, or any other machine capable of executing program instructions.

Thus, in one aspect, each method described above and combinations thereof may be embodied in computer executable code that, when executing on one or more computing devices, performs the steps thereof. In another aspect, the methods may be embodied in systems that perform the steps thereof, and may be distributed across devices in a number of ways, or all of the functionality may be integrated into a dedicated, standalone device or other hardware. In another aspect, the means for performing the steps associated with the processes described above may include any of the hardware and/or software described above. All such permutations and combinations are intended to fall within the scope of the present disclosure.

While the invention has been disclosed in connection with the preferred embodiments shown and described in detail, various modifications and improvements thereon will become readily apparent to those skilled in the art. Accordingly, the spirit and scope of the present invention is not to be limited by the foregoing examples, but is to be understood in the broadest sense allowable by law.

All documents referenced herein are hereby incorporated by reference.

What is claimed is:

1. A computer-implemented method for implementing an automated workflow over multiple channels, the method comprising:
    creating a first communications session with a first user on a first channel using a first automated workflow, wherein the first automated workflow processes a communication of a user and selects an action from a plurality of actions;
    obtaining a plurality of first channel action implementations for the first channel, wherein each first channel action implementation corresponds to an action of the plurality of actions;
    receiving a first communication from the first user on the first channel;

selecting a first action of the plurality of actions by processing the first communication with the first automated workflow;
obtaining a first channel action implementation from the plurality of first channel action implementations using the first action;
transmitting a first response to the first user on the first channel using the first channel action implementation;
creating a second communications session with a second user on a second channel using the first automated workflow;
obtaining a plurality of second channel action implementations for the second channel, wherein each second channel action implementation corresponds to an action of the plurality of actions;
receiving a second communication from the second user on the second channel;
selecting the first action of the plurality of actions by processing the second communication with the first automated workflow;
obtaining a second channel action implementation from the plurality of second channel action implementations using the first action; and
transmitting a second response to the second user on the second channel using the second channel action implementation.

2. The computer-implemented method of claim 1, wherein the first channel is a voice channel and the second channel is a customer support channel implemented on a web page.

3. The computer-implemented method of claim 1, wherein the first channel action implementation comprises generating audio of speech to present to the first user.

4. The computer-implemented method of claim 1, wherein selecting the first action of the plurality of actions comprises:
selecting a first intent from a plurality of intents by processing the first communication with a machine learning model; and
selecting the first action using the first intent.

5. The computer-implemented method of claim 1, wherein selecting the first action of the plurality of actions comprises performing named entity recognition on the first communication.

6. The computer-implemented method of claim 1, wherein selecting the first action comprises:
updating a state of the first automated workflow using the first communication; and
selecting the first action using the updated state.

7. The computer-implemented method of claim 1, wherein selecting the first action comprises:
traversing from a first node of a directed graph to a second node of the directed graph using the first communication; and
selecting the first action using the second node of the directed graph.

8. The computer-implemented method of claim 1, wherein:
the first response requests a first information item and a second information item from the first user; and
the second response requests the first information item and does not request the second information item from the second user.

9. A system for implementing an automated workflow over multiple channels, the system comprising:
at least one server computer comprising at least one processor and at least one memory, the at least one server computer configured to:
create a first communications session with a first user on a first channel using a first automated workflow, wherein the first automated workflow processes a communication of a user and selects an action from a plurality of actions;
obtain a plurality of first channel action implementations for the first channel, wherein each first channel action implementation corresponds to an action of the plurality of actions;
receive a first communication from the first user on the first channel;
select a first action of the plurality of actions by processing the first communication with the first automated workflow;
obtain a first channel action implementation from the plurality of first channel action implementations using the first action;
transmit a first response to the first user on the first channel using the first channel action implementation;
create a second communications session with a second user on a second channel using the first automated workflow;
obtain a plurality of second channel action implementations for the second channel, wherein each second channel action implementation corresponds to an action of the plurality of actions;
receive a second communication from the second user on the second channel;
select the first action of the plurality of actions by processing the second communication with the first automated workflow;
obtain a second channel action implementation from the plurality of second channel action implementations using the first action; and
transmit a second response to the second user on the second channel using the second channel action implementation.

10. The system of claim 9, wherein the at least one server computer is configured to select the first action by obtaining information from the first communication.

11. The system of claim 10, wherein the at least one server computer is configured to obtain information from the first communication by determining an intent of the first communication or performing named entity recognition on the first communication.

12. The system of claim 9, wherein the at least one server computer is configured to:
store a first state of the first automated workflow during the first communications session to a data store;
end the first communications session;
create a third communications session with the first user on the second channel;
obtain the first state of the first automated workflow from the data store;
initialize a second instance of the first automated workflow using the first state; and
process a third communication from the first user on the second channel using the second instance of the first automated workflow.

13. The system of claim 9, wherein the at least one server computer is configured to:
provide suggestions to users communicating on the first channel; and
not provide suggestions to users communicating on the second channel.

14. The system of claim 13, wherein the suggestions comprise suggested messages to be sent by users or suggested completions of text being entered by users.

15. The system of claim 9, wherein the second channel action implementation comprises presenting a form to the first user.

16. The system of claim 9, wherein the at least one server computer is configured to obtain the first channel action implementation by using a state of the first automated workflow or a node of a directed graph.

17. One or more non-transitory, computer-readable media comprising computer-executable instructions that, when executed, cause at least one processor to perform actions comprising:
- creating a first communications session with a first user on a first channel using a first automated workflow, wherein the first automated workflow processes a communication of a user and selects an action from a plurality of actions;
- obtaining a plurality of first channel action implementations for the first channel, wherein each first channel action implementation corresponds to an action of the plurality of actions;
- receiving a first communication from the first user on the first channel;
- selecting a first action of the plurality of actions by processing the first communication with the first automated workflow;
- obtaining a first channel action implementation from the plurality of first channel action implementations using the first action;
- transmitting a first response to the first user on the first channel using the first channel action implementation;
- creating a second communications session with a second user on a second channel using the first automated workflow;
- obtaining a plurality of second channel action implementations for the second channel, wherein each second channel action implementation corresponds to an action of the plurality of actions;
- receiving a second communication from the second user on the second channel;
- selecting the first action of the plurality of actions by processing the second communication with the first automated workflow;
- obtaining a second channel action implementation from the plurality of second channel action implementations using the first action; and
- transmitting a second response to the second user on the second channel using the second channel action implementation.

18. The one or more non-transitory, computer-readable media of claim 17, wherein the first channel action implementation comprises generating audio of speech to present to the first user and the second channel action implementation comprises presenting a form to the first user.

19. The one or more non-transitory, computer-readable media of claim 17, wherein the plurality of first channel action implementations are specified using structured data.

20. The one or more non-transitory, computer-readable media of claim 17, wherein the first channel action implementation comprises presenting one or more buttons to the first user.

* * * * *